(12) United States Patent
Yan et al.

(10) Patent No.: US 10,999,194 B2
(45) Date of Patent: May 4, 2021

(54) INFORMATION SYNCHRONIZATION METHOD, APPARATUS, AND SYSTEM

(71) Applicant: Huawei Technologies Co., Ltd., Shenzhen (CN)

(72) Inventors: Changjiang Yan, Beijing (CN); Shunwan Zhuang, Beijing (CN); Nan Wu, Beijing (CN); Guoyi Chen, Beijing (CN); Zhenbin Li, Beijing (CN); Baohua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 16/279,401

(22) Filed: Feb. 19, 2019

(65) Prior Publication Data
US 2019/0182152 A1 Jun. 13, 2019

Related U.S. Application Data

(63) Continuation of application No. PCT/CN2017/095280, filed on Jul. 31, 2017.

(30) Foreign Application Priority Data

Aug. 19, 2016 (CN) .......................... 201610698182.3

(51) Int. Cl.
H04L 12/741 (2013.01)
H04L 12/715 (2013.01)
(Continued)

(52) U.S. Cl.
CPC .............. H04L 45/54 (2013.01); H04L 45/64 (2013.01); *H04L 47/125* (2013.01); *H04L 47/24* (2013.01)

(58) Field of Classification Search
None
See application file for complete search history.

(56) References Cited

U.S. PATENT DOCUMENTS 9,191,139 B1 11/2015 Venkata et al.
2010/0039939 A1* 2/2010 Wang ...................... H04L 45/04
370/238

(Continued)

FOREIGN PATENT DOCUMENTS

CN 104184663 A 12/2014
CN 105391633 A 3/2016
(Continued)

OTHER PUBLICATIONS

Lougheed, K., et al., "A Border Gateway Protocol (BGP)", Network Working Group, RFC 1105, Jun. 1989, 17 pages.
(Continued)

*Primary Examiner* — Diane L Lo
(74) *Attorney, Agent, or Firm* — Conley Rose, P.C.

(57) ABSTRACT

An information synchronization method includes sending, by a controller, a first message to a network device, where the first message carries control routing protocol (CRP) routing entry information, and is used to advertise a CRP route, and the first message includes first identification information, and after receiving the first message, storing, by a forwarding device, the CRP routing entry information into a CRP routing table of the network device as indicated by the first identification information. Hence, because a route advertised by the controller and a route advertised using a routing protocol between forwarding devices are stored in different routing tables, a related application of the route advertised using the routing protocol between the forwarding devices is not affected.

27 Claims, 8 Drawing Sheets

(51) Int. Cl.
*H04L 12/803* (2013.01)
*H04L 12/851* (2013.01)

(56) References Cited

U.S. PATENT DOCUMENTS

| | | | | |
|---|---|---|---|---|
| 2010/0265956 | A1* | 10/2010 | Li | H04L 45/04 370/401 |
| 2013/0311661 | A1 | 11/2013 | McPhee | |
| 2015/0146536 | A1 | 5/2015 | Minei et al. | |
| 2015/0381493 | A1* | 12/2015 | Bansal | H04L 45/745 370/392 |
| 2016/0191324 | A1* | 6/2016 | Olofsson | H04L 41/5041 709/220 |
| 2017/0012895 | A1* | 1/2017 | Zhao | H04L 45/741 |

FOREIGN PATENT DOCUMENTS

| | | |
|---|---|---|
| CN | 105516028 A | 4/2016 |
| CN | 105704037 A | 6/2016 |
| CN | 106059924 A | 10/2016 |

OTHER PUBLICATIONS

Rosen, E., BGP/MPLS IP Virtual Private Networks (VPNs), RFC 4364, Feb. 2006, 47 pages.
Fredler, H. Ed., et al., "North-Bound Distribution of Link-State and TE Information using BGP", draft-ietf-idr-ls-distribution-11, Jun. 2015, 45 pages.
Anonymous, Subsequent Address Family Identifiers (SAFI) Parameters, Retrieved from the internet: http://www.iana.org/assignments/safi-namespace/safi-namespace.xhtml on Mar. 5, 2019, 2 pages.
PCE Working Group Meeting Tuesday, Nov. 3, 2015, Retrieved from the internet: https://www.ietf.org/proceedings/94/minutes/minutes-94-pce, 3 pages.
Lougheed, K., et al., "A Border Gateway Protocol (BGP)", Network Working Group, RFC 1163, Jun. 1990, 29 pages.
Lougheed K., et al., "A Border Gateway Protocol 3 (BGP-3)", Network Working Group, RFC 1267, Oct. 1991, 35 pages.
Rekhter, Y. Ed., et al., "A Border Gateway Protocol 4 (BGP-4)", Network Working Group, Category: Standards Track, RFC 4271, Jan. 2006, 104 pages.
Bates, T., et al., "Multiprotocol Extensions for BGP-4", Network Working Group, Category: Standards Track, RFC 4760, Jan. 2007, 12 pages.
Reynolds, J., et al,. "Assigned Numbers," Network Working Group, RFC 1700, Oct. 1994, 230 pages.
Scudder, J., et al., "Capabilities Advertisement with BGP-4," RFC 5492, Feb. 2009, 7 pages.
Bates, T., et al., "BGP Route Reflection: An Alternative to Full Mesh Internal BGP (IBGP)," RFC 4456, Apr. 2006, 12 pages.
Walton, D., et al., "Advertisement of Multiple Paths in BGP", draft-ietf-idr-add-paths-10, Oct. 24, 2014, 8 pages.
Foreign Communication From a Counterpart Application, Chinese Application No. 201610698182.3, Chinese Office Action dated Apr. 15, 2019, 5 pages.
Foreign Communication From a Counterpart Application, PCT Application No. PCT/CN2017/095280, English Translation of International Search Report dated Oct. 19, 2017, 2 pages.
Foreign Communication From a Counterpart Application, PCT Application No. PCT/CN2017/095280, English Translation of Written Opinion dated Oct. 19, 2017, 4 pages.

* cited by examiner

INFORMATION SYNCHRONIZATION METHOD, APPARATUS, AND SYSTEM

CROSS-REFERENCE TO RELATED APPLICATIONS

This application is a continuation of International Patent Application No. PCT/CN2017/095280 filed on Jul. 31, 2017, which claims priority to Chinese Patent Application No. 201610698182.3 filed on Aug. 19, 2016. The disclosures of the aforementioned applications are hereby incorporated by reference in their entireties.

TECHNICAL FIELD

This application relates to the field of communications technologies, and in particular, to an information synchronization method, an apparatus, and a system.

BACKGROUND

In recent years, value of software-defined networking (SDN) has been recognized by telecommunications network operators, and the SDN is the direction of future network evolution. An SDN system includes a controller and a forwarding device, where the controller may be used to control network traffic, and the forwarding device may be used to forward a received packet. A control plane and a forwarding plane (also referred to as a data plane) of a network device are separated from each other using an SDN technology, thereby implementing flexible control over network traffic, and accelerating network service innovation.

The Border Gateway Protocol (BGP) is a dynamic routing protocol used between autonomous systems (AS), and is mainly used to exchange reachable routing information between the ASs, and construct a propagation path between AS domains. A currently used version is BGP-4 (RFC 4271). As an exterior routing protocol standard on the Internet, the BGP protocol is widely applied between Internet service providers (ISPs). To provide support for a plurality of network layer protocols, the Internet Engineering Task Force (IETF) has extended BGP-4 to form Multiprotocol Extensions for BGP (MP-BGP).

In a current SDN architecture, if the controller uses the BGP protocol to advertise a route to the forwarding device, the route advertised by the controller and a route advertised using common BGP between forwarding devices are stored in a same BGP routing information base (RIB) also referred to as routing table). As shown in FIG. 1, a route sent by the controller is processed as a common BGP route, and after the route advertised by the controller is preferentially selected, a related application of the route advertised using the common BGP is affected. For example, a forwarding device A advertises a route P1 prefixed with X to a forwarding device B, and the controller advertises a route P2 also prefixed with X to the forwarding device B. In this case, the forwarding device B receives the two routes that are prefixed with same X. The forwarding device B forwards the routes to a forwarding device C, and during route selection, a priority of the route P2 is higher than a priority of the route P1. The forwarding device B sends the route P2 to the forwarding device C. In this case, a related application of the route P1 is affected. For example, it is specified that when a BGP Multi-Exit-Disc (MED) attribute associated with the route P1 is set to 100, the route P1 is introduced into an Intermediate System to Intermediate System (ISIS) RIB of the forwarding device C. However, in this case, because the route P2 is preferentially selected, and a MED attribute of the route P2 is set to 200, the route P2 is not introduced into the ISIS RIB, consequently, affecting a related application of the route P1 advertised using the common BGP between the forwarding devices.

If the controller uses a first Path Computation Element Communication Protocol (PCEP) or another existing routing protocol to advertise a route to the forwarding device, a similar problem still exists. To be specific, the route advertised by the controller and a common PCEP route between the forwarding devices or a route in another routing protocol are stored in a same PCEP routing information base RIB or a common routing information base RIB under the other routing protocol. In this case, the route advertised by the controller is processed as the common PECP route or the common route in the other protocol. After the route advertised by the controller is preferentially selected, a related application of the route advertised using the common PCEP or the other protocol is affected.

SUMMARY

In view of this, embodiments of this application provide an information synchronization method. A controller sends routing entry information to a forwarding device, and the forwarding device creates a routing table that separately stores the routing entry information sent by the controller. A preferred route in the routing table is added to a routing management (RM) RIB such that an RM module can select a route from routes that are generated using different protocols, such as a route sent by the controller, a static route, an ISIS route, an Open Shortest Path First (OSPF) route, and a BGP route. In addition, because the route advertised by the controller and a route advertised using a routing protocol between forwarding devices are stored in different routing tables, a related application of the route between the forwarding devices is not affected.

According to a first aspect, an embodiment of this application provides an information synchronization method, including first determining, by a controller, control routing protocol (CRP) routing entry information, where the CRP routing entry information includes a mapping relationship between a route prefix and an address of a first next hop of a network device, and the "CRP" is a protocol that is run between the controller and a forwarding device and that allows the controller to advertise a route to the forwarding device, generating, by the controller, a first message, where the first message carries the CRP routing entry information, and is used to advertise a CRP route, the first message includes first identification information, and the first identification information is used to instruct the network device to store the CRP routing entry information into a CRP routing table of the network device, and then, sending, by the controller, the first message to the network device such that the network device stores the CRP routing entry information into the CRP routing table based on the first identification information, and directs packet forwarding based on the CRP routing table.

Therefore, according to the information synchronization method in this embodiment of this application, the CRP protocol is run between the controller and the network device, and indication information such as the first identification information mentioned above is used such that the network device can create the separate CRP routing table based on the indication information, to store the CRP routing entry information sent by the controller. Because the network device stores the CRP route advertised by the controller and a route advertised using a routing protocol between network devices into different routing tables, a routing policy related to the CRP route does not affect a related application of a routing policy that is related to the route advertised using the routing protocol between the network devices.

With reference to the first aspect, in a first possible implementation of the first aspect, the CRP routing entry information further includes a route priority, where the route priority is used to identify a priority at which the CRP route is used to direct packet forwarding.

The priority of the CRP route may be flexibly set by adding the route priority to the CRP routing entry information. For example, the CRP route is set as a preferred route, thereby achieving an objective of controlling traffic using the route advertised by the controller. Subsequent various complex policy control over the route can be completed by upgrading the controller. This is unlike an existing routing policy such as a BGP routing policy, which requires all devices to implement complex policies. Therefore, traffic control is simpler and more flexible. In addition, in some application scenarios, if a customer considers that an internally deployed interior gateway protocol (IGP) route is trusted and should be preferentially selected, while an external route is untrusted and should not be preferentially selected, the priority of the CRP route may be set to be lower than priorities of an ISIS route and an OSPF route. It can be learned that different needs of the customer can be met by setting the priority of the CRP route.

With reference to the first aspect and the foregoing possible implementation, in a second possible implementation of the first aspect, the CRP routing entry information further includes attribute information of the first next hop, and the attribute information of the first next hop includes one or more of the following attribute information types of a next hop, bandwidth, a load balancing ratio, and a type of the next hop.

Attribute information of the next hop is carried in the CRP routing entry information such that the network device can obtain the attribute information of the next hop from the CRP routing table, and send the attribute information of the next hop to a forwarding information base (FIB) in order to direct packet forwarding.

With reference to the first aspect and the foregoing possible implementations, in a third possible implementation of the first aspect, the first message is a first BGP update message, where the first BGP update message includes a multiprotocol reachable network layer reachability information (MP_REACH_NLRI) attribute field, the MP_REACH_NLRI attribute field includes a subsequent address family identifier (SAFI) field, a network layer reachability information (NLRI) field, and a next hop information field, the SAFI field indicates that the MP_REACH_NLRI attribute field is encapsulated based on an encapsulation format supported by a BGP synchronization address family, and carries the first identification information, the NLRI field carries the route prefix, and the next hop information field carries the address of the first next hop.

The first identification information may be directly indicated by a SAFI value in the SAFI field.

Optionally, the NLRI field includes a type-length-value (TLV) field, where a type T field of the TLV field indicates that a type of the TLV field is a BGP route synchronization type, and a value V field of the TLV field carries the route prefix.

With reference to the first aspect and the foregoing possible implementations, in a fourth possible implementation of the first aspect, the first message is a first PCEP message, where the first PCEP message includes a Message-Type field, a Route object field, and a Next Hop object field, the Message-Type field carries the first identification information, the Route object field carries the route prefix, and the Next Hop object field carries the address of the first next hop.

The first identification information may be directly indicated by a Message-Type value in the Message-Type field.

With reference to the second possible implementation of the first aspect, in a fifth possible implementation of the first aspect, the first message is a first BGP update message, where the first BGP update message includes an MP_REACH_NLRI attribute field and a Route Synchronization Attribute field, the MP_REACH_NLRI attribute field includes an SAFI field, an NLRI field, and a next hop information field, the SAFI field indicates that the MP_REACH_NLRI attribute field is encapsulated based on an encapsulation format supported by a BGP synchronization address family, and carries the first identification information, the NLRI field carries the route priority, the next hop information field carries the address of the first next hop, and the Route Synchronization Attribute field carries the route priority. In an optional implementation, the Route Synchronization Attribute field includes a sub-TLV field, where the sub-TLV field includes a T field, an L field, and a V field, the T field indicates the route priority, and the V field indicates a value determined based on the route priority.

The first identification information may be directly indicated by a SAFI value in the SAFI field.

Optionally, the NLRI field includes a TLV field, where a type T field of the TLV field indicates that a type of the TLV field is a BGP route synchronization type, and a value V field of the TLV field carries the route prefix.

With reference to the second possible implementation of the first aspect, in a sixth possible implementation of the first aspect, the first message is a first PCEP message, where the first PCEP message includes a Message-Type field, a Route object field, a Next Hop object field, and a Route Attribute object field, the Message-Type field is used to carry the first identification information, the Route object field carries the route prefix, the Next Hop object field carries the address of the first next hop, and the Route Attribute object field carries the route priority. In an optional implementation, the Route Attribute object field includes a sub-TLV field, where the sub-TLV field includes a T field, an L field, and a V field, the T field indicates the route priority, and the V field indicates a value determined based on the route priority.

The first identification information may be directly indicated by a Message-Type value in the Message-Type field.

With reference to the third possible implementation of the first aspect, in a seventh possible implementation of the first aspect, the first message is a first BGP update message, where the first BGP update message includes an MP_REACH_NLRI attribute field and a Next Hop Attribute field, the MP_REACH_NLRI attribute field includes an SAFI field, an NLRI field, and a next hop information field, the SAFI field indicates that the MP_REACH_NLRI attribute field is encapsulated based on an encapsulation format supported by a BGP synchronization address family, and carries the first identification information, the NLRI field carries the route prefix, the next hop information field carries the address of the first next hop, and the Next Hop Attribute field carries the attribute information of the first next hop. In an optional implementation, the Next Hop Attribute field includes at least one sub-TLV field, and each attribute information type of the next hop corresponds to one of the at least one sub-TLV field. Each sub-TLV field includes a T field, an L field, and a V field, where the T field indicates any one of the attribute information types of the next hop, and the V field indicates content determined based on a corresponding attribute information type of the next hop.

The first identification information may be directly indicated by a SAFI value in the SAFI field.

With reference to the third possible implementation of the first aspect, in an eighth possible implementation of the first aspect, the first message is a first PCEP message, where the first PCEP message includes a Message-Type field, a Route object field, a Next Hop object field, and a Next Hop Attribute object field, the Message-Type field carries the first identification information, the Route object field carries the route prefix, the Next Hop object field carries the address of the first next hop, and the Next Hop Attribute object field carries the attribute information of the first next hop. In an optional implementation, the Next Hop Attribute object field includes at least one sub-TLV field, and each attribute information type of the next hop corresponds to one of the at least one sub-TLV field. Each sub-TLV field includes a T field, an L field, and a V field, where the T field indicates any one of the attribute information types of the next hop, and the V field indicates content determined based on a corresponding attribute information type of the next hop.

The first identification information may be directly indicated by a Message-Type value in the Message-Type field.

With reference to the first aspect and the foregoing possible implementations, in a ninth possible implementation of the first aspect, the method further includes generating, by the controller, a second message, where the second message carries entry information of a second next hop of the network device, the entry information of the second next hop includes a mapping relationship between an address of the second next hop of the network device and attribute information of the second next hop, the second message includes second identification information, and the second identification information is used to instruct the network device to store the entry information of the second next hop into a next hop table of the network device, and sending, by the controller, the second message to the network device such that the network device stores the entry information of the second next hop into the next hop table of the network device based on the second identification information.

The address of the second next hop may be the same as or different from the address of the first next hop. Attribute information types of the second next hop include but are not limited to the following parameter types an access type of the next hop, such as an Internet Protocol (IP) network or a Virtual Extensible Local Area Network (VXLAN), available bandwidth, a load balancing ratio, and the like.

In the foregoing technical solutions, the controller separately sends next hop information to the network device without a need to bind the route prefix such that the network device stores a next hop address and next hop attribute information into the separately maintained next hop table, thereby implementing separate management on the next hop information of the network device by the controller. The separate management includes separately creating a new entry or updating the next hop information. In the foregoing solutions, next hop management on the network device by the controller is more flexible, system resources occupied because the route prefix is carried in information exchange between the controller and the network device for next hop management are effectively saved, information that needs to be parsed by the network device is reduced, and service processing efficiency of the network device is also improved.

Further, when the controller separately sends the next hop information to the network device, the controller-customized attribute information of the next hop is carried, and the attribute information of the next hop is used to describe a differentiation characteristic between the next hop and another next hop. For example, in some application scenarios, there is a need to describe available bandwidth of the next hop, a load balancing ratio of the next hop, and the like. Therefore, the network device can obtain the attribute information of the next hop from the next hop table, and send the attribute information of the next hop to the FIB in order to direct packet forwarding.

With reference to the ninth possible implementation of the first aspect, in a tenth possible implementation of the first aspect, the second message is a second BGP update message, where the second BGP update message includes a MP_REACH_NLRI attribute field and a Next Hop Attribute field, the MP_REACH_NLRI attribute field includes an SAFI field, an NLRI field, and a next hop information field, the SAFI field indicates that the MP_REACH_NLRI attribute field is encapsulated based on an encapsulation format supported by a BGP synchronization address family, and carries the second identification information, the NLRI field carries the address of the second next hop or the next hop information field carries the address of the second next hop, and the Next Hop Attribute field carries the attribute information of the second next hop. In an optional implementation, the Next Hop Attribute field includes at least one sub-TLV field, and each attribute information type of the next hop corresponds to one of the at least one sub-TLV field. Each sub-TLV field includes a T field, an L field, and a V field, where the T field indicates any one of the attribute information types of the second next hop, and the V field indicates content determined based on a corresponding attribute information type of the second next hop.

The second identification information may be directly indicated by a SAFI value in the SAFI field.

With reference to the ninth possible implementation of the first aspect, in an eleventh possible implementation of the first aspect, the second message is a second PCEP message, where the second PCEP message includes a Message-Type field, a Next Hop object field, and a next hop attribute object field, the Message-Type field is used to carry the second identification information, the Next Hop object field carries the address of the second next hop, and the Next Hop Attribute object field carries the attribute information of the second next hop. In an optional implementation, the Next Hop Attribute object field includes at least one sub-TLV field, and each attribute information type of the next hop corresponds to one of the at least one sub-TLV field. Each sub-TLV field includes a T field, an L field, and a V field, where the T field indicates any one of the attribute information types of the next hop, and the V field indicates content determined based on a corresponding attribute information type of the next hop.

The second identification information may be directly indicated by a Message-Type value in the Message-Type field.

Optionally, the first PCEP message further includes a status request parameters (RP) object field. That the Message-Type field carries the second identification information includes the Message-Type field and the RP object field jointly carry the second identification information. To be specific, the second identification information may be indicated by both the Message-Type value in the Message-Type field and a value of an R flag in the RP object field.

With reference to the first aspect and the foregoing possible implementations, in a twelfth possible implementation of the first aspect, the method further includes generating, by the controller, a third message, where the third message carries an address of a third next hop of the network device, the third message includes third identification information, and the third identification information is used to instruct the network device to delete, from the locally stored next hop table, an entry that is of the third next hop and that corresponds to the address of the third next hop, and sending, by the controller, the third message to the network device such that the network device deletes the entry of the third next hop as indicated by the third identification information.

It can be learned that, the controller sends the third message that carries the address of the first next hop, and the network device deletes, from the separately stored next hop table based on the third identification information carried in the third message, an entry of the third next hop that corresponds to the address of the third next hop, without a need to delete an unavailable next hop by binding the route prefix and canceling a large quantity of routing messages, thereby saving network resources. In addition, when a plurality of routing entries correspond to a same next hop, the plurality of routing entries that use the next hop can be deleted by deleting the next hop corresponding to the plurality of routing entries. Therefore, only one message needs to be sent between the controller and the network device to achieve an objective of quickly deleting routing entries in batches. Therefore, a quantity of messages exchanged between the controller and the forwarding device is greatly reduced, thereby saving system resources, and improving service processing efficiency.

With reference to the twelfth possible implementation of the first aspect, in a thirteenth possible implementation of the first aspect, the third message is a third BGP update message, where the third BGP update message includes a multiprotocol unreachable network layer reachability information (MP_UNREACH_NLRI) attribute field, the MP_UNREACH_NLRI attribute field includes an SAFI field and an unreachable NLRI field, the SAFI field indicates that the MP_UNREACH_NLRI attribute field is encapsulated based on an encapsulation format supported by a BGP synchronization address family, and carries the third identification information, and the unreachable NLRI field carries the address of the third next hop.

The third identification information may be directly indicated by a SAFI value in the SAFI field.

With reference to the twelfth possible implementation of the first aspect, in a fourteenth possible implementation of the first aspect, the third message is a third PCEP message, where the third PCEP message includes a Message-Type field and a Next Hop object field, the Message-Type field indicates that the third PCEP message is used to send the address of the third next hop to the network device, and is used to carry the third identification information, and the Next Hop object field carries the address of the third next hop.

The third identification information may be directly indicated by a Message-Type value in the Message-Type field.

With reference to the fourteenth possible implementation of the first aspect, in a fifteenth possible implementation of the first aspect, the third PCEP message further includes a status RP object field. That the Message-Type field carries the third identification information further includes the Message-Type field and the RP object field jointly carry the third identification information. To be specific, the third identification information may be indicated by both the Message-Type value in the Message-Type field and a value of an R flag in the RP object field.

With reference to the first aspect and the foregoing possible implementations, in a sixteenth possible implementation of the first aspect, the method further includes receiving, by the controller, a fourth message sent by the network device, where the fourth message carries route status report information, and the route status report information includes a mapping relationship between the route prefix and status information of the CRP route, and updating, by the controller, statistical information of the route prefix based on the received route status report information to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, route status information reported by the network device, to learn a route status of the network device in real time, and use the route status information as a basis for adjusting the route, thereby improving traffic control reliability and realtimeness.

With reference to the first aspect and the foregoing possible implementations, in a seventeenth possible implementation of the first aspect, the method further includes receiving, by the controller, a fifth message sent by the network device, where the fifth message carries next hop status report information, and the next hop status report information includes a mapping relationship between an address of a fourth next hop of the network device and status information of the fourth next hop, and updating, by the controller, statistical information of the fourth next hop based on the received next hop status report information to use updated statistical information as a basis for re-calculating the next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, status information of the next hop reported by the forwarding device to learn a status of the forwarding device in real time, and use the status information of the next hop as a basis for calculating and adjusting a next hop, thereby improving traffic control reliability and realtimeness.

According to a second aspect, an embodiment this application provides an information synchronization method, including first receiving, by a network device, a first message sent by a controller, where the first message carries CRP routing entry information determined by the controller, and is used to advertise a CRP route, the CRP routing entry information includes a mapping relationship between a route prefix and an address of a first next hop of the network device, and the first message includes first identification information, and then storing, by the network device, the CRP routing entry information into a local CRP routing table as indicated by the first identification information, and directing packet forwarding based on the CRP routing table.

The CRP protocol is run between the controller and the network device, and the separate CRP routing table is created on the network device to store the CRP routing entry information sent by the controller. Because the CRP route advertised by the controller and a route advertised using a routing protocol between network devices are stored in different routing tables, a routing policy related to the CRP route does not affect a related application of a routing policy embodied by a route in the routing protocol between the network devices.

With reference to the second aspect, in a first possible implementation of the second aspect, the CRP routing entry information further includes a route priority, where the route priority is used to identify a priority at which the CRP route is used to direct packet forwarding.

The priority of the CRP route may be flexibly set by adding the route priority to the CRP routing entry information. For example, the CRP route is set as a preferred route, thereby achieving an objective of controlling traffic using the route advertised by the controller. Subsequent various complex policy control over the route can be completed by upgrading the controller. This is unlike an existing routing policy such as a BGP routing policy, which requires all devices to implement complex policies. Therefore, traffic control is simpler and more flexible. In addition, in some application scenarios, if a customer considers that an internally deployed IGP route is trusted and should be preferentially selected, while an external route is untrusted and should not be preferentially selected, the priority of the CRP route may be set to be lower than priorities of an ISIS route and an OSPF route. It can be learned that different needs of the customer can be met by setting the priority of the CRP route.

With reference to the second aspect and the foregoing possible implementation, in a second possible implementation of the second aspect, the CRP routing entry information further includes attribute information of the first next hop, and the attribute information of the first next hop includes one or more of the following attribute information types of a next hop, bandwidth, a load balancing ratio, and an access type of the next hop. The method further includes storing, by the network device, the address of the first next hop and the attribute information of the first next hop into an entry of the first next hop in a next hop table of the network device, where the entry of the first next hop records a mapping relationship between the address of the first next hop and the attribute information of the first next hop.

Attribute information of the next hop is carried in the CRP routing entry information such that the network device can obtain the attribute information of the next hop from the CRP routing table, and send the attribute information of the next hop to a FIB in order to direct packet forwarding.

With reference to the second possible implementation of the second aspect, in a third possible implementation of the second aspect, the method further includes obtaining, by the network device, the attribute information of the first next hop, and sending the attribute information of the first next hop to the FIB in order to direct packet forwarding.

With reference to the second aspect and the foregoing possible implementations, in a fourth possible implementation of the second aspect, the method further includes receiving, by the network device, a second message sent by the controller, where the second message carries entry information of a second next hop of the network device, the entry information of the second next hop records a mapping relationship between an address of the second next hop of the network device and attribute information of the second next hop, and the second message includes second identification information, and storing, by the network device, the entry information of the second next hop into the next hop table of the network device as indicated by the second identification information.

Therefore, the controller separately sends next hop information to the network device without a need to bind the route prefix such that the network device stores a next hop address and next hop attribute information into the separately maintained next hop table, thereby implementing separate management on the next hop information of the network device by the controller. The separate management includes separately creating a new entry or updating the next hop information. In the foregoing solutions, next hop management on the network device by the controller is more flexible, system resources occupied because the route prefix is carried in information exchange between the controller and the network device for next hop management are effectively saved, information that needs to be parsed by the network device is reduced, and service processing efficiency of the network device is also improved. When the controller separately sends the next hop information to the network device, a controller-customized attribute information of the next hop that is associated with the next hop is carried, and the attribute information of the next hop is used to describe a differentiation characteristic between the next hop and another next hop. For example, in some application scenarios, there is a need to describe available bandwidth of the next hop, a load balancing ratio of the next hop, and the like. Therefore, the network device can obtain the attribute information of the next hop from the next hop table, and send the attribute information of the next hop to the FIB in order to direct packet forwarding.

With reference to the fourth possible implementation of the second aspect, in a fifth possible implementation of the second aspect, the method further includes searching, by the network device, the next hop table using the address of the second next hop as a keyword to obtain the attribute information of the second next hop, and sending the attribute information of the second next hop to the FIB in order to direct packet forwarding.

With reference to the second aspect and the foregoing possible implementations, in a sixth possible implementation of the second aspect, the method further includes receiving, by the network device, a third message sent by the controller, where the third message carries an address of a third next hop of the network device, and the third message includes third identification information, and deleting, by the network device as indicated by the third identification information, from the next hop table stored in the network device, an entry that is of the third next hop and that corresponds to the address of the third next hop.

It can be learned that, the controller sends the first message that carries the address of the first next hop, and the network device deletes, from the separately stored next hop table based on the first identification information carried in the first message, the entry of the first next hop that corresponds to the address of the first next hop, without a need to delete an unavailable next hop by binding the route prefix and canceling a large quantity of routing messages, thereby saving network resources.

With reference to the sixth possible implementation of the second aspect, in a seventh possible implementation of the second aspect, the deleting, by the network device as indicated by the third identification information, from the next hop table stored in the network device, an entry that is of the third next hop and that corresponds to the address of the third next hop further includes searching, by the network device as indicated by the third identification information, the next hop table using the address of the third next hop as a keyword, to hit an entry of the third next hop, and deleting the entry of the third next hop.

With reference to the seventh possible implementation of the second aspect, in an eighth possible implementation of the second aspect, the method further includes deleting, by the network device, a routing entry associated with the address of the third next hop.

When a plurality of routing entries correspond to a same next hop, and when the controller determines that the next hop is unavailable, the plurality of routing entries that use the next hop can be deleted by deleting the next hop. Therefore, only one message needs to be sent between the controller and the network device, to achieve an objective of quickly deleting routing entries in batches. Therefore, a quantity of messages exchanged between the controller and a forwarding device is greatly reduced, thereby saving system resources, and improving service processing efficiency.

With reference to the second aspect and the foregoing possible implementations, in a ninth possible implementation of the second aspect, the method further includes generating, by the network device, a fourth message, where the fourth message carries route status report information, and the route status report information records a mapping relationship between the route prefix and status information of the CRP route, and sending, by the network device, the fourth message to the controller such that the controller updates statistical information of the route prefix based on the received route status report information to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, route status information reported by the network device, to learn a route status of the network device in real time, and use the route status information as a basis for adjusting the route, thereby improving traffic control reliability and realtimeness.

With reference to the ninth possible implementation of the second aspect, in a tenth possible implementation of the second aspect, the fourth message is a fourth BGP update message, where the fourth BGP update message includes an MP_REACH_NLRI attribute field and a Route Status Report Attribute field, the MP_REACH_NLRI attribute field includes an NLRI field, the NLRI field is used to carry the route prefix, and the Route Status Report Attribute field is used to carry the status information of the CRP route. In an optional implementation, the Route Status Report Attribute field includes at least one sub-TLV field, and each status information type of the CRP route corresponds to one of the at least one sub-TLV field. Each sub-TLV field includes a T field, an L field, and a V field, where the T field indicates any one of status information types of the CRP route, and the V field indicates content determined based on a corresponding status information type of the CRP route.

With reference to the ninth possible implementation of the second aspect, in an eleventh possible implementation of the second aspect, the fourth message is a fourth PCEP message, where the fourth PCEP message includes a Message-Type field, a Route object field, and a Route Status Report Attribute object field, the Message-Type field indicates that the fourth PCEP message is used to send the route status report information to the controller, the Route object field carries the route prefix, and the Route Status Report Attribute object field carries the status information of the CRP route. In an optional implementation, the Route Status Report Attribute object field includes at least one sub-TLV field, and each status information type of the CRP route corresponds to one of the at least one sub-TLV field. Each sub-TLV field includes a T field, an L field, and a V field, where the T field indicates any one of status information types of the CRP route, and the V field indicates content determined based on a corresponding status information type of the CRP route.

With reference to the second aspect and the foregoing possible implementations, in a twelfth possible implementation of the second aspect, the method further includes generating, by the network device, a fifth message, where the fifth message carries next hop status report information, and the next hop status report information includes a mapping relationship between an address of a fourth next hop of the network device and status information of the fourth next hop, and sending, by the network device, the fifth message to the controller such that the controller updates statistical information of the next hop based on the received next hop status report information, to use updated statistical information as a basis for re-calculating a next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, status information of the next hop reported by the forwarding device to learn a status of the forwarding device in real time, and use the status information of the next hop as a basis for calculating and adjusting a next hop, thereby improving traffic control reliability and realtimeness.

With reference to the twelfth possible implementation of the second aspect, in a thirteenth possible implementation of the second aspect, the fifth message is a fifth BGP update message, where the fifth BGP update message includes a MP_REACH_NLRI attribute field and a Next Hop Status Report Attribute field, the MP_REACH_NLRI attribute field includes a NLRI field, the NLRI field is used to carry the address of the fourth next hop, and the Next Hop Status Report Attribute field is used to carry the status information of the fourth next hop. In an optional implementation, the Next Hop Status Report Attribute field includes at least one sub-TLV field, and each status information type of the next hop corresponds to one of the at least one sub-TLV field. Each sub-TLV field includes a T field, an L field, and a V field, where the T field indicates any one of status information types of the next hop, and the V field indicates content determined based on a corresponding status information type of the next hop.

With reference to the twelfth possible implementation of the second aspect, in a fourteenth possible implementation of the second aspect, the fifth message is a fifth PCEP message, where the fifth PCEP message includes a Message-Type field, a Next Hop object field, and a Next Hop Status Report Attribute object field, the Message-Type field indicates that the fifth PCEP message is used to send the next hop status report information to the controller, the Next Hop object field carries the address of the fourth next hop, and the Next Hop Status Report Attribute object field carries the status information of the fourth next hop. In an optional implementation, the Next Hop Status Report Attribute object field includes at least one sub-TLV field, and each status information type of the next hop corresponds to one of the at least one sub-TLV field. Each sub-TLV field includes a T field, an L field, and a V field, where the T field indicates any one of status information types of the next hop, and the V field indicates content determined based on a corresponding status information type of the next hop.

According to a third aspect, an embodiment of this application provides a controller configured to perform the method according to the first aspect or any possible implementation of the first aspect. Further, the controller includes modules configured to perform the method according to the first aspect or any possible implementation of the first aspect.

According to a fourth aspect, an embodiment of this application provides a network device configured to perform the method according to the second aspect or any possible implementation of the second aspect. Further, the network device includes modules configured to perform the method according to the second aspect or any possible implementation of the second aspect.

According to a fifth aspect, an embodiment of this application provides a communications system, including the controller provided in the third aspect and the network device provided in the fourth aspect.

According to a sixth aspect, an embodiment of this application provides a controller, where the controller includes an input interface, an output interface, a processor, and a memory. The input interface, the output interface, the processor, and the memory may be connected to each other using a bus system. The memory is configured to store a program, an instruction, or code, and the processor is configured to execute the program, the instruction, or the code in the memory, to complete the method according to the first aspect or any possible implementation of the first aspect.

According to a seventh aspect, an embodiment of this application provides a network device, where the network device includes an input interface, an output interface, a processor, and a memory. The input interface, the output interface, the processor, and the memory may be connected to each other using a bus system. The memory is configured to store a program, an instruction, or code, and the processor is configured to execute the program, the instruction, or the code in the memory, to complete the method according to the second aspect or any possible implementation of the second aspect.

According to an eighth aspect, an embodiment of this application provides a computer readable storage medium configured to store a computer program, where the computer program is used to execute an instruction for the method according to the first aspect, the second aspect, any possible implementation of the first aspect, or any possible implementation of the second aspect.

DESCRIPTION OF EMBODIMENTS

An application scenario is described in the embodiments of this application to describe the technical solutions in the embodiments of this application more clearly, and does not constitute a limitation to the technical solutions provided in the embodiments of this application. A person of ordinary skill in the art may learn that with evolution of network architectures and appearance of new service scenarios, the technical solutions provided in the embodiments of this application are also applicable to a similar technical problem.

Unless otherwise stated, ordinal numbers such as "first", "second", "third", "fourth", and "fifth" are used in the embodiments of this application to differentiate a plurality of objects, but are not used to limit a sequence of the plurality of objects.

Figure 2:
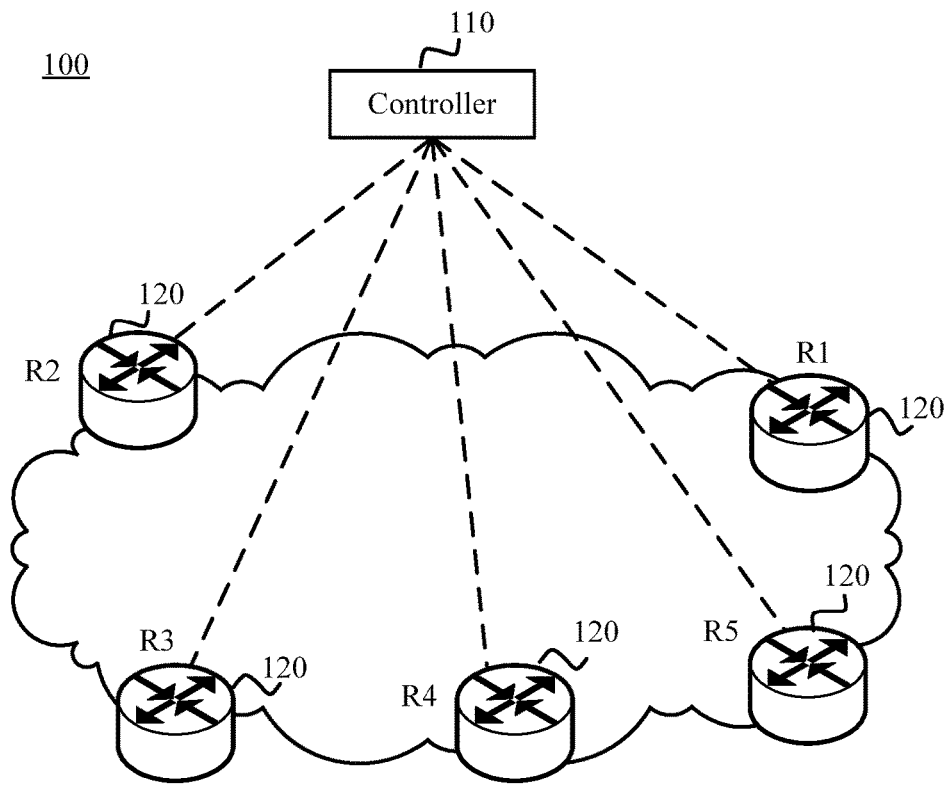
FIG. 2 is a schematic diagram of an application scenario according to an embodiment of this application.

The following describes a scenario of the embodiments of this application using an example with reference to FIG. 2.

FIG. 2 shows SDN 100 to which the embodiments of this application are applied. The SDN 100 includes a controller 110 and a plurality of network devices 120. In this application, the controller 110 may also be referred to as a control device, a control system, or a control node. Optionally, the controller 110 may be a smart network controller (SNC). However, this embodiment of this application is not limited thereto.

The network device 120 may be configured to forward a packet. The network device 120 may be a routing and forwarding device such as a conventional router or switch in a conventional path computation element (PCE) network, or may be a routing and forwarding device such as a router or a switch in SDN based on separation of control and forwarding. This is not limited in this embodiment of this application.

FIG. 2 shows five routers R1 to R5. It should be understood that, FIG. 2 shows an example of one controller and five routers. The network 100 may include any other quantities of controllers and network devices. This is not limited in this embodiment of this application.

Figure 1:
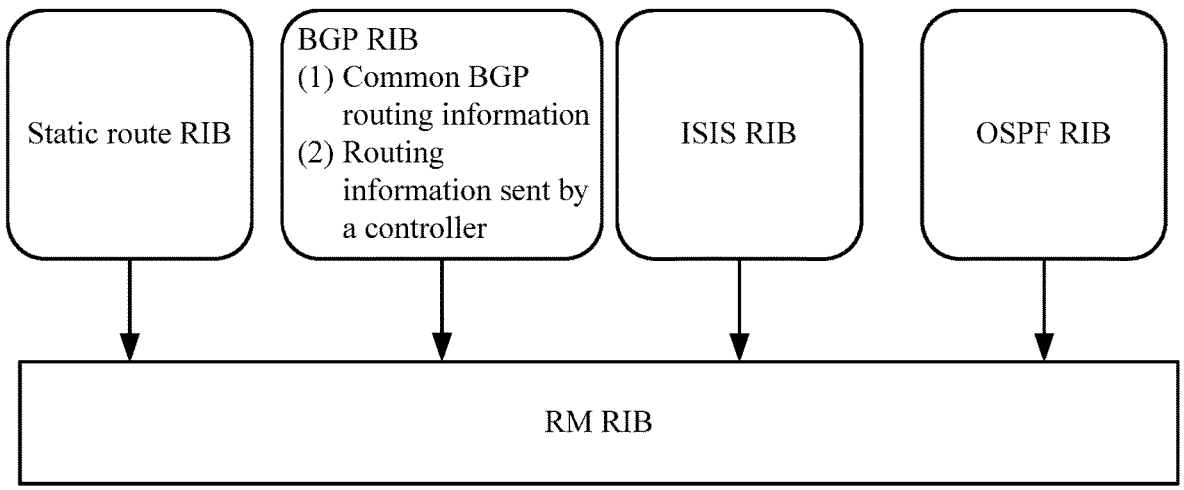
FIG. 1 is a schematic diagram of advertising a route by a controller.

The controller 110 determines routing entry information by collecting network element resource information and network topology information of the network devices 120, generates a corresponding route, and advertises the route to the network device 120. After receiving the route advertised by the controller, the network device 120 stores the route into a routing table that is separately maintained by the network device 120. Both the route advertised by the controller and a route advertised using another protocol are sent to an RM RIB, for example, the RM RIB shown in FIG. 1. The RM RIB selects an optimal route through inter-protocol route selection, and uses the optimal route as a basis for forwarding a packet by the network device 120.

Figure 3A:
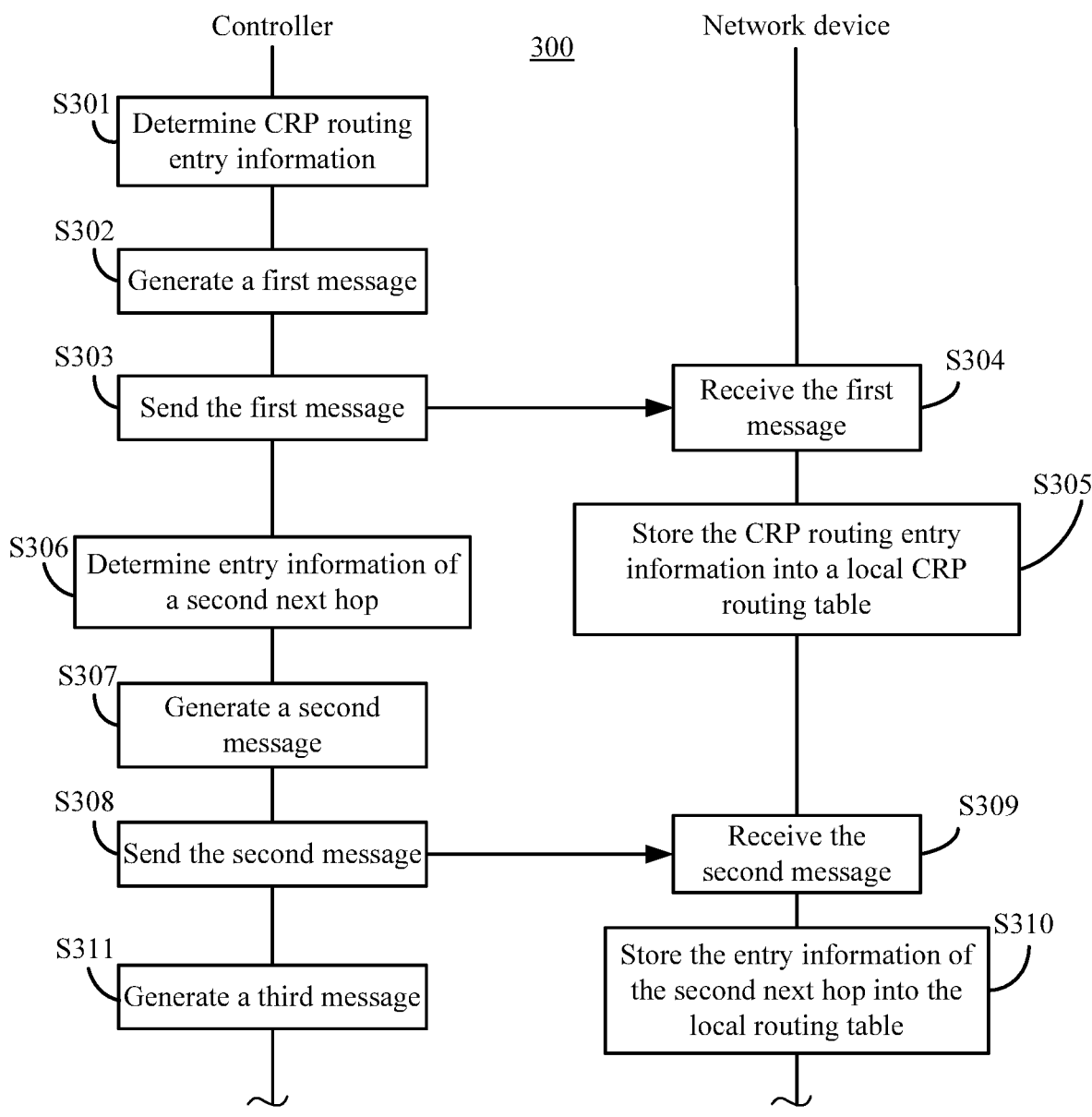
FIG. 3A and FIG. 3B are a schematic flowchart of a method for information synchronization according to an embodiment of this application.
Figure 3B:
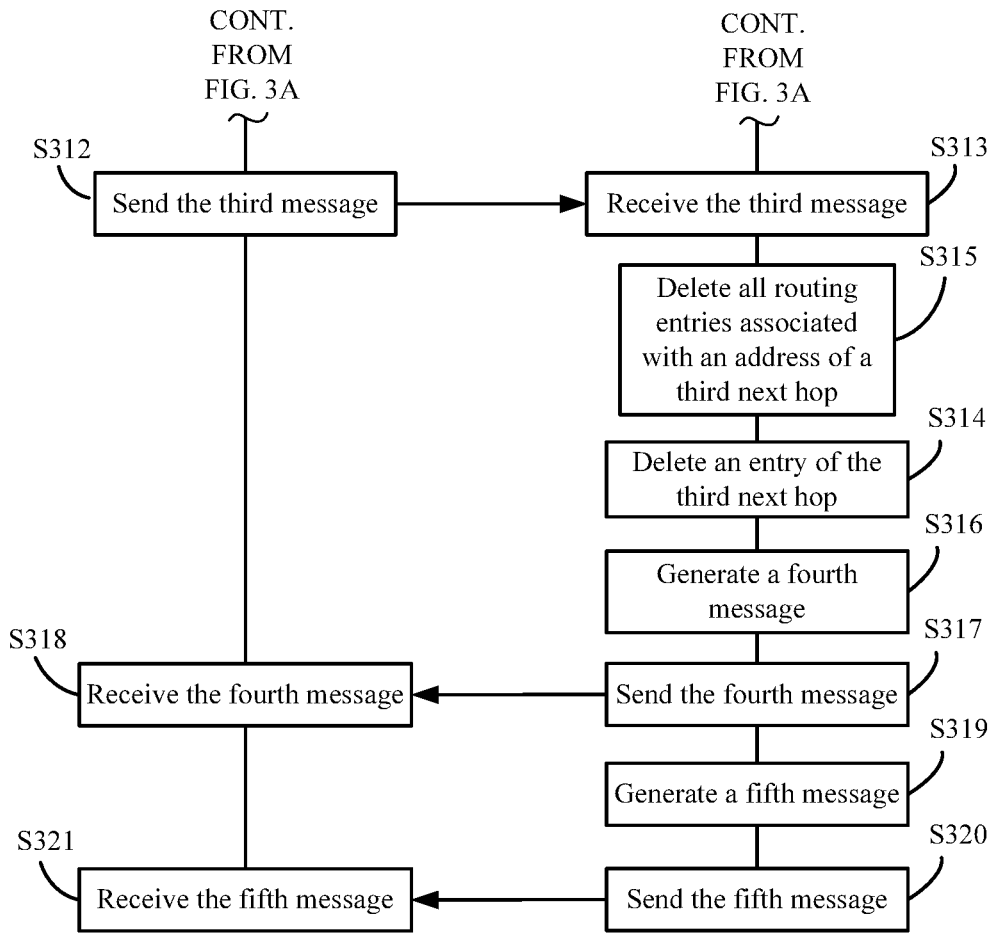

The following describes an information synchronization method 300 provided in an embodiment of this application in detail with reference to FIG. 3A and FIG. 3B. The method 300 may be applied to the SDN 100 shown in FIG. 2, but this embodiment of this application is not limited thereto. As shown in FIG. 3A and FIG. 3B, the method includes the following steps.

Step S301: A controller determines CRP routing entry information, where the CRP routing entry information records a mapping relationship between a route prefix and an address of a first next hop.

The "CRP" described in this application is a protocol that is run between the controller and a forwarding device and that allows the controller to advertise a route to the forwarding device. Based on the CRP protocol, the forwarding device stores the route generated and advertised by the controller into a routing table separately maintained by the forwarding device. The routing table is referred to as "CRP routing table". The CRP protocol may be an extended protocol formed by extending an existing routing protocol such that the CRP protocol may carry the route forwarded by the controller to the forwarding device. The CRP protocol is, for example, a BGP extended protocol formed by extending the existing routing protocol BGP, or an extended PCEP protocol formed by extending the existing PCEP protocol. The CRP protocol may alternatively be an extension to a created routing protocol used between conventional forwarding devices. The CRP protocol may alternatively be a created protocol that is used for interaction between the controller and the conventional forwarding device and that carries routing information sent by the controller. A specific protocol that carries the route advertised by the controller is not limited in this application. In addition, the conventional forwarding device described in this embodiment of this application may be understood as an impure or hybrid SDN forwarding device, such as a forwarding device that not only has controlling and forwarding functions of the conventional forwarding device, but also has a function of forwarding based on the route advertised by the controller in an SDN control and forwarding separation scenario. Moreover, the CRP routing table may be understood as a routing table used to store the route advertised by the controller to be distinguished from a routing table of another form, for example, distinguished from a routing table used to store a route advertised between forwarding devices. If the CRP routing entry information is carried using the extended protocol, for example, carried using an extended BGP protocol, the network device stores the CRP routing table that stores the route advertised by the controller and a BGP routing table that stores a common BGP route (for example, a route advertised between network devices). The CRP routing table includes a plurality of routing entries, which are referred to as "CRP routing entries". Routing information recorded in each CRP routing entry is referred to as "CRP routing entry information." The route advertised by the controller to the forwarding device is referred to as "CRP route".

For example, the CRP routing table may be shown in Table 1.

TABLE 1

| Network | Next-Hop | Status | Preference | Topology | Band Width | Another field |
|---|---|---|---|---|---|---|
| 1.1.1.0/24 | 1.1.1.1 | 0x80000000 | 1 | 1 | | |
| 1.1.1.2/32 | 1.1.1.1 | 0x80000000 | 1 | 2 | | |
| 2.2.2.0/24 | 2.2.2.2 | 0x80000000 | 3 | | | |
| 2.2.2.2/32 | 2.2.2.2 | 0x80000000 | 3 | | | |
| 5.1.1.0/24 | 1.1.1.1 | 0xD0000000 | 1 | | | |
| 6.1.1.0/24 | 2.2.2.2 | 0xD0000000 | 3 | | | |
| 100.1.1.0/24 | 1.1.1.1 | 0xC0000000 | 1 | | | |

As shown in Table 1, the CRP routing table includes a plurality of CRP routing entries. Fields in the CRP routing table in Table 1 are explained as follows:

Network field: indicates a route prefix, and is usually indicated using a destination address/a mask (destination/Mask). If a natural mask is used, the mask may be omitted.

Next-Hop field: indicates an address of a next hop.

Status field: indicates a route status.

Preference field: indicates a route priority. The route priority is used to indicate a priority at which the CRP route is used to direct packet forwarding. A smaller value of the route priority indicates a higher route priority. A priority of the CRP route may be flexibly set using the Preference field.

Topology field: indicates a topology identifier of a network device. When a corresponding topology identifier is specified, a corresponding topology is used based on specified identification information, or when no specific identifier is specified, a default global topology is used.

Band Width field: indicates available bandwidth of a next hop.

When the controller advertises the CRP route to the network device, each piece of CRP routing entry information needs to include at least the mapping relationship between the route prefix and the address of the next hop, and information included in the other field is optional carried information, and may be configured by default. After receiving a packet, the network device may forward the packet to a next hop network device as directed by the CRP routing table.

In a specific implementation, the "Status" field may include 32 bits, and each bit indicates a route status. For example, an encapsulation format of the "Status" field is shown in Table 2.

TABLE 2

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| V | B | A | D | | | | | | | | | | | | |

V, namely, Valid: 1 indicates that the route is a valid route, and 0 indicates that the route is an invalid route.

B, namely, Best: 1 indicates that the route is an optimal route, and 0 indicates that the route is a non-optimal route.

A, namely, Active: 1 indicates that the route is an active route, and 0 indicates that the route is an inactive route.

D, namely, Download to FIB: 1 indicates that the route is sent to a FIB, and 0 indicates that the route is not sent to a FIB.

The following is used as an example to describe encoding of the "Status".

0x80000000: Only the bit V is 1, which indicates that the route is valid, non-optimal, inactive, and not sent to the FIB.

0xD0000000: The three bits V, B, and D are each 1, and the bit A is 0, which indicate that the route is valid, optimal, and sent to the FIB, but inactive.

Only the foregoing four bits are used as an example in this application to describe how to use the Status field in the CRP routing table. A person skilled in the art may understand that, in the foregoing four bits, 0 and 1 may indicate opposite meanings. For example:

V, namely, Valid: 0 indicates that the route is a valid route, and 1 indicates that the route is an invalid route.

B, namely, Best: 0 indicates that the route is an optimal route, and 1 indicates that the route is a non-optimal route.

A, namely, Active: 0 indicates that the route is an active route, and 1 indicates that the route is an inactive route.

D, namely, Download to FIB: 0 indicates that the route is sent to a FIB, and 1 indicates that the route is not sent to a FIB.

Other numbers may be used to indicate the foregoing status information. This is not limited in this embodiment of this application.

A person skilled in the art may understand that, the Status field may be encapsulated in another encapsulation format. This is merely illustrative description, and should not be understood as a limitation to this application.

It should be understood that, the plurality of types of information listed in Table 1 are merely an example, but do not constitute a limitation to this application. In addition, although the plurality of types of information is listed in Table 1, a person skilled in the art may understand that, the CRP routing entry information does not necessarily include all information. Alternatively, the CRP routing entry information may include information that is indicated by another field and that is not listed herein. This is not limited in this embodiment of this application.

In a specific implementation, the controller may be configured to control network traffic, and send control routing information to the network device. For example, the controller may be the controller 110 shown in FIG. 2. The network device may be any one of R1 to R5 shown in FIG. 2. In an optional example, the controller may be an SNC. However, this is not limited in this embodiment of this application.

The controller calculates the CRP route by collecting network element resource information and network topology information of the network devices, and determines the CRP routing entry information. The network element resource information includes but is not limited to label information, interface resource information, virtual local area network (VLAN) information, and a tunnel identifier (also referred to as ID). The network topology information is information that describes a connection relationship between a node and a link and between nodes in a network. The controller can obtain topology information of an entire network based on existing various topology collection protocols, such as an IGP, the ISIS protocol, and the OSPF protocol. The network topology information includes but is not limited to information about a path between the network devices in the SDN. Optionally, the network topology information further includes weight information of a path between the network devices, and the like.

Step S302: The controller generates a first message, where the first message is used to advertise a CRP route.

The controller generates the first message, where the first message carries the CRP routing entry information, and is used to advertise the CRP route, the first message includes first identification information, and the first identification information is used to instruct the network device to store the CRP routing entry information into the CRP routing table of the network device.

The network device may be further a switch or a router. The network device may be any one of R1 to R5 shown in FIG. 2.

In a specific implementation, the first message may be a first BGP update message. The first BGP update message includes an MP_REACH_NLRI attribute field. The MP_REACH_NLRI attribute field includes an SAFI field, an NLRI field, and a next hop information field. The SAFI field indicates that the MP_REACH_NLRI attribute field is encapsulated based on an encapsulation format supported by a BGP synchronization address family, and carries the first identification information. The NLRI field carries the route prefix. The next hop information field carries the address of the first next hop.

The first identification information is directly indicated by a SAFI value in the SAFI field of the BGP synchronization address family.

In this embodiment of this application, a BGP synchronization address family may be added to an existing BGP address family, and the foregoing CRP routing entry information may be encapsulated based on an encapsulation format supported by the added BGP synchronization address family. Further, an encapsulation format that is of MP_REACH_NLRI and that is added based on the BGP synchronization address family is shown in FIG. 4.

Figure 4:
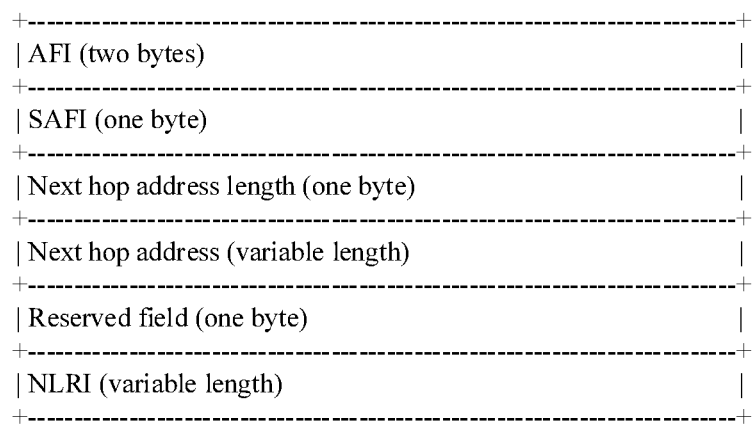
FIG. 4 is a schematic diagram of a MP_REACH_NLRI field encapsulated based on an encapsulation format supported by a BGP synchronization address family according to an embodiment of this application.

FIG. 4 is a schematic diagram of an MP_REACH_NLRI attribute field encapsulated based on an encapsulation format indicated by a BGP synchronization address family according to an embodiment of this application.

The MP_REACH_NLRI may be understood as multiprotocol extension attribute information of NLRI, and includes three parts, an address family information (AFI) field, a next hop information field, and an NLRI field.

The AFI field includes an address family identifier field (two bytes) and an SAFI field (one byte). The address family identifier (AFI) is used to identify a network layer protocol. For example, an AFI value of 1 indicates IP version 4 (IPv4), and an AFI value of 2 indicates IP version 6 (IPv6). The SAFI identifies a type of a subsequent address family. For example, a SAFI value of 1 indicates unicast, a SAFI value of 2 indicates multicast, and a SAFI value of 128 indicates a Virtual Private Network (VPN). An AFI value of 1 and a SAFI value of 1 indicate that an IPv4 unicast route is carried in the NLRI field, an AFI value of 1 and a SAFI value of 128 indicate that a BGP-VPNv4 route is carried in the NLRI field, or an AFI value of 1 and a SAFI value of 4 indicate that a BGP label route is carried in the NLRI field.

In this embodiment of this application, the BGP synchronization address family may be understood as a subsequent address family extended from an IPv4 or IPv6 address family in the existing BGP protocol. That is, the AFI value may be 1 or 2. The SAFI value may be determined based on a standard formulated by IETF.

The next hop information field includes an address length field (one byte) of a next hop and an address field (variable length) of the next hop. The address length field of the next hop is used to identify a length of the address field of the next hop, and the length of the address field of the next hop is determined by the length indicated by the address length field of the next hop.

There is a one-byte reserved field between the next hop information field and the NLRI field.

The NLRI field includes the NLRI field.

In a specific implementation, the NLRI field may be indicated by a 2-tuple (Length-Prefix). Length: indicates a length of a route prefix in units of bytes. Prefix: includes a route prefix, which is followed by trailing bits, used to ensure that the end of the field complies with a byte boundary. Values of the trailing bits have no meaning.

Figure 5:
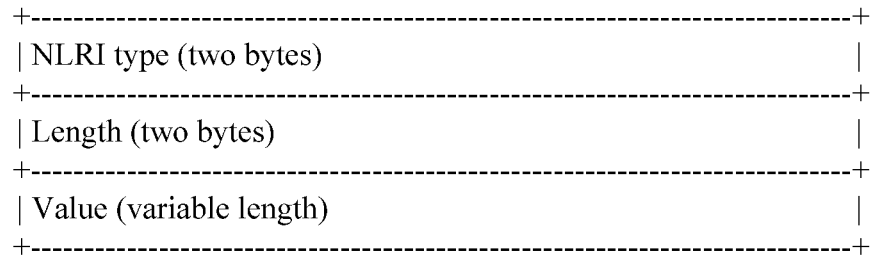
FIG. 5 is a schematic diagram of a TLV field in an NLRI field according to an embodiment of this application.

In another specific implementation, the NLRI field includes a TLV field (variable length). FIG. 5 is a schematic diagram of a TLV field in an NLRI field according to an embodiment of this application. A type T field indicates that a type of the TLV field is a BGP synchronization type, a length L field indicates a length of a V field, and the value V field carries content determined based on the BGP synchronization type. In this embodiment of this application, a value 1 of the T field may indicate a BGP route synchronization (Route Entry Synchronization) type. Optionally, a value of the L field is 16 bits, namely, two bytes, and the V field indicates a route prefix with a length indicated by the value of the L field. The BGP synchronization type includes the BGP route synchronization type.

It should be understood that, the example herein in which the type 1 type is the BGP route synchronization type is merely used for illustrative description, and should not be construed as any limitation to this application. This embodiment of this application does not exclude a possibility that the type 1 is used to indicate another type, or another manner is used to indicate the BGP route synchronization type. In addition, a quantity of types of the NLRI type is not limited in this embodiment of this application either.

In another specific implementation, the first message is a first PCEP message. The first PCEP message includes a Message-Type field, a Route object field, and a Next Hop object field. The Message-Type field indicates that the first PCEP message is used to advertise the CRP route to the network device, and is used to carry the first identification information. The Route object field carries the route prefix. The Next Hop object field carries the address of the first next hop.

The first identification information is directly indicated by a Message-Type value in the Message-Type field.

In this embodiment of this application, a message type may be added to an existing Message-Type value to indicate the first PCEP message. In this embodiment of this application, the first PCEP message may also be referred to as a PCE-initiated routing message. Generally, a PCEP message includes a common message header and a variable-length message body, and the message body includes a series of objects. Further, the first PCEP message includes a common message header, the Route object, and the next hop object.

Figure 6:
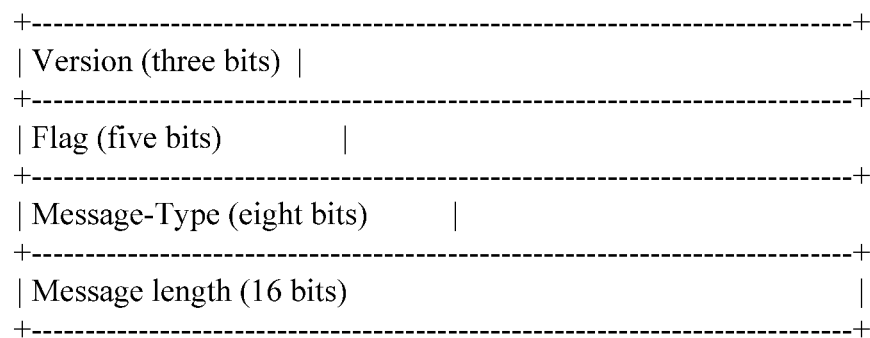
FIG. 6 is a schematic diagram of an encapsulation format of a common message header of a PCEP message according to an embodiment of this application.

An encapsulation format of the common message header of the first PCEP message is shown in FIG. 6. FIG. 6 is a schematic diagram of an encapsulation format of a common message header of a first PCEP message according to an embodiment of this application.

Fields in FIG. 6 are explained as follows:

Version field (three bits): identifies a PCEP version number. A current version number is 1.

Flags field (five bits): indicates flags. The flag field is not defined currently. Assigned five bits are considered as reserved bits, and need to be set to zeros at a transmit end, and ignored at a receive end.

Message-Type field (eight bits): the message type is to be defined.

In this embodiment of this application, the Message-Type in the first PCEP message (for example, the foregoing PCE-initiated routing message) may be understood as a message type extended from the Message-Type in the existing PCEP protocol, and a value of the Message-Type may be determined based on the standard formulated by the IETF.

Message length field (16 bits): identifies a total length of the PCEP message (including a length of a common header), in units of bytes.

An object of a PCEP message includes a common object header and an object body.

Figure 7:
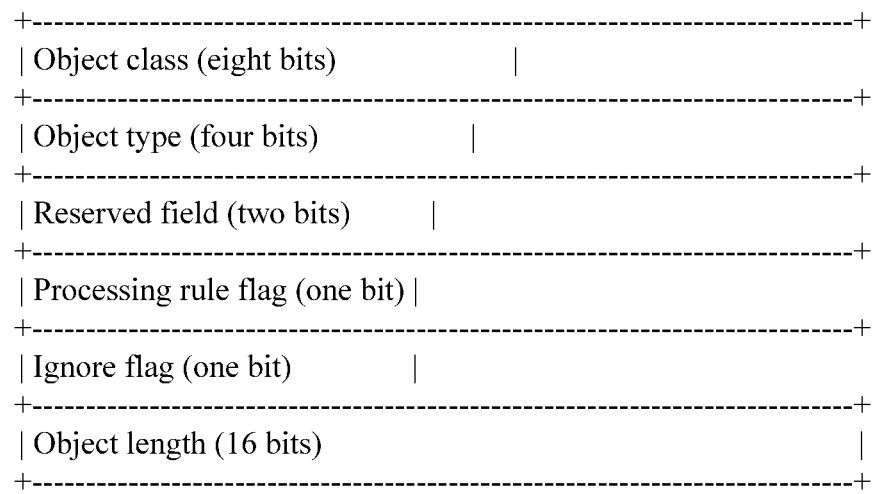
FIG. 7 is a schematic diagram of an encapsulation format of a common object header of an object of a PCEP message according to an embodiment of this application.

An encapsulation format of the common object header is shown in FIG. 7.

Fields in the common object header are explained as follows:

Object class (also referred to as Object-Class) field (eight bits): identifies a category of a PCEP object.

Object type (also referred to as Object-Type (OT)) field (four bits): identifies a type of the PCEP object.

The Object-Class field and the OT field are managed by the Internet Assigned Numbers Authority (IANA), and jointly and uniquely determine a PCEP object. For example, in a PCEP OPEN object, a value of the Object-Class is 1, a value of the Object-Type is 1, and the Object-Class and the Object-Type jointly and uniquely determine the OPEN object.

Generally, one Object-Class includes at least one Object-Type.

Reserved field (two bits): The reserved field is padded with zeros during transmitting, and is ignored during reception.

Processing rule flag (P) field (one bit): indicates a processing rule, and is not related to this application.

Ignore flag (I) field (one bit): indicates an ignore field, and is not related to this application.

Object length field (16 bits): identifies a length of an object, including a length of an object header, in units of bytes.

Optionally, the object body includes one or more optional sub-TLV fields. Each sub-TLV field includes a T field, an L field, and a V field. The T field identifies a type of a sub-object, and occupies two bytes, the L field identifies a length of a sub-object, including a message header, in units of bytes, and the V field identifies content determined based on a type of a sub-object.

Optionally, the object body includes a series of sub-objects, and the sub-object may be encapsulated based on an encapsulation format of a sub-object defined in RFC 3209.

Figure 8:
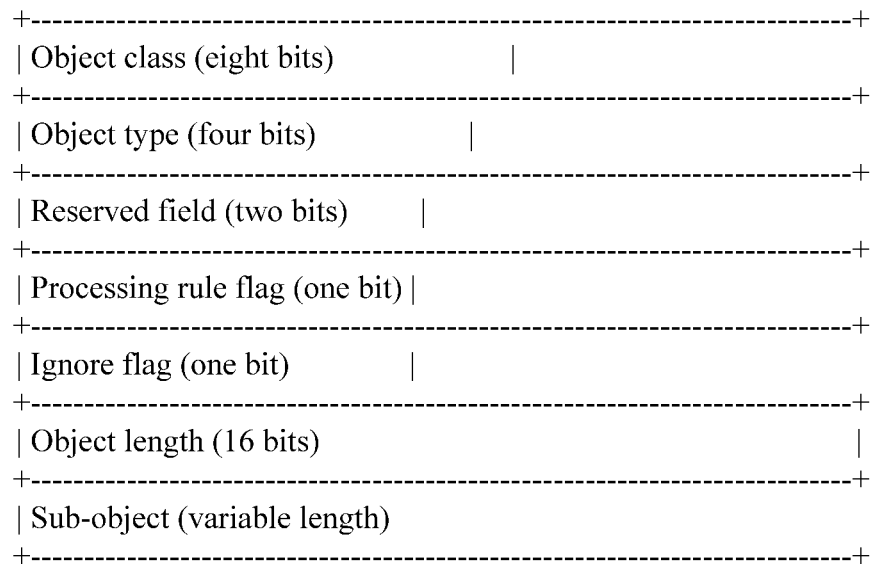
FIG. 8 is a schematic diagram of an encapsulation format of a Route object in a PCEP message according to an embodiment of this application.

Further, for example, an encapsulation format of the Route object is shown in FIG. 8.

Fields of the Route object are explained as follows.

A value of the Object-Class is to be defined, and is managed by the IANA. A value of the Object type (OT) is 1. The Object class and the Object type jointly and uniquely determine the Route object. The Reserved field is padded with zeros during transmitting, and ignored during reception.

A Processing rule flag field and an Ignore flag field are not used in this Route object, and are set to zeros.

A value of the Object length is equal to the length of the Route object, including an object header.

The Route object includes one or more sub-objects, the sub-object is variable in length, and a length of the Sub-object field is determined by a length indicated by the Object length field.

Figure 9:
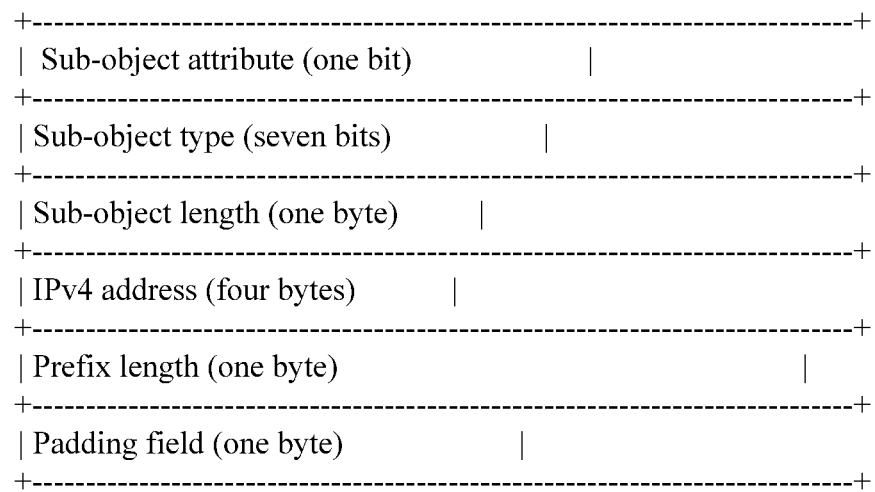
FIG. 9 is a schematic diagram of an encapsulation format of a Sub-object in a Route object according to an embodiment of this application.

In a specific implementation, the Sub-object in the Route object is an IPv4 prefix sub-object, and carries an IPv4 address prefix. For example, an encapsulation format shown in FIG. 9 may be used for encapsulation, as shown in FIG. 9.

Fields of the IPv4 prefix sub-object are explained as follows:

Sub-object attribute (L) field: In the Route object, the bit L is not used temporarily, and is set to 0.

Sub-object type (Type) field: A value of 0x01 indicates an IPv4 address. The value of the Type is merely used for illustrative description, and is not limited.

Sub-object length (Length) field: indicates a length of a sub-object.

IPv4 address field: indicates an IPv4 address. This address is considered as a prefix based on the following prefix length. Bits beyond the prefix are ignored during reception, and are set to zeros during transmitting.

Prefix length field: indicates a length of an IPv4 prefix.

Padding field: is set to zeros during transmitting, and ignored during reception.

Content of an IPv4 prefix object is a four-byte IPv4 address, a one-byte prefix length, and a one-byte padding field. Abstract nodes indicated by the sub-object are a series of nodes having a same IP address prefix. A prefix length of 32 indicates a single IPv4 node.

Figure 10:
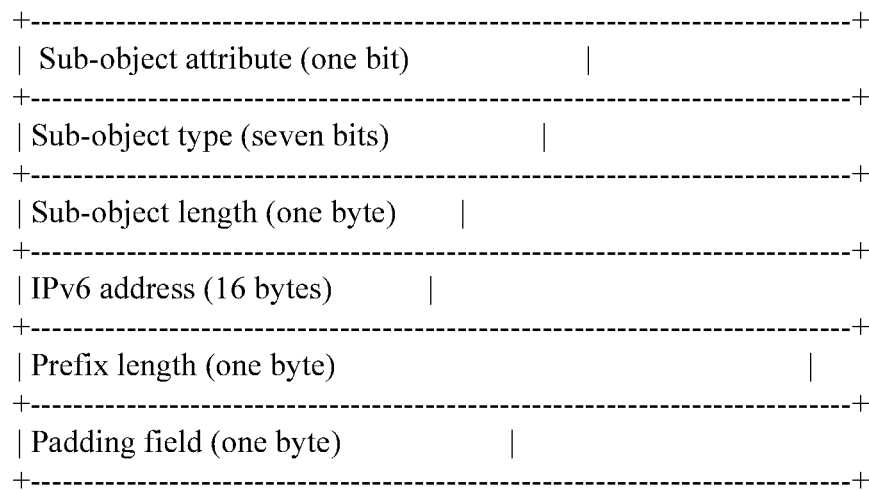
FIG. 10 is a schematic diagram of an encapsulation format of a Sub-object in a Route object according to another embodiment of this application.

In another specific implementation, the Sub-object in the Route object is an IPv6 prefix sub-object, and carries an IPv6 address prefix. For example, an encapsulation format shown in FIG. 10 may be used for encapsulation, as shown in FIG. 10.

Fields of the IPv6 prefix sub-object are explained as follows:

Sub-object attribute (L) field: In the Route object, the bit L is not used temporarily, and is set to 0.

Sub-object type field: A value of 0x02 indicates an IPv6 address.

Sub-object length field: indicates a length of a sub-object.

IPv6 address field: indicates an IPv6 address. This address is considered as a prefix based on the following prefix length. Bits beyond the prefix are ignored during reception, and are set to zeros during transmitting.

Prefix length field: indicates a length of an IPv6 prefix.

Padding field: is set to zeros during transmitting, and ignored during reception.

Content of an IPv6 prefix sub-object is a 16-byte IPv6 address, a one-byte prefix length, and a one-byte padding field. Abstract nodes indicated by the sub-object are a series of nodes having a same IP prefix. A prefix length of 128 indicates a single IPv6 node.

It should be understood that, the values and/or the lengths of the fields listed herein are merely used for illustrative description, and should not be construed as any limitation to this application. This embodiment of this application does not exclude a possibility that the Object-Type field has another value.

It should be understood that the encapsulation format of the Route object listed herein is merely used for illustrative description. In this embodiment of this application, the encapsulation format of the Route object and a value of a related field in the Route object are not limited. This embodiment of this application does not exclude a possibility that the Route object is encapsulated in another encapsulation format.

Figure 11:
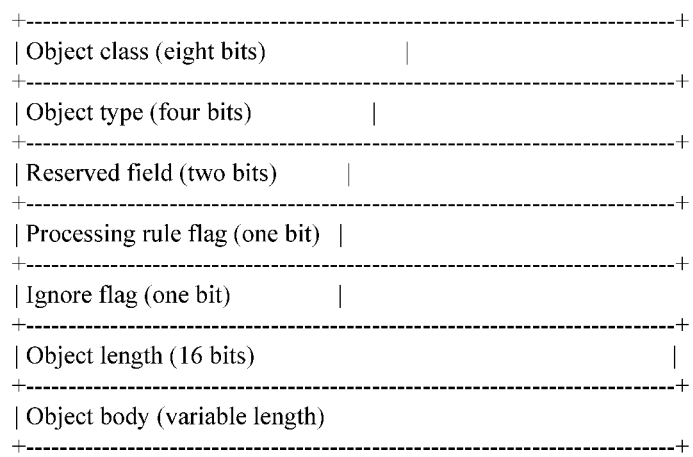
FIG. 11 is a schematic diagram of an encapsulation format of a Next Hop object in a PCEP message according to an embodiment of this application.

Further, for example, an encapsulation format of the Next Hop object is shown in FIG. 11.

Fields of the Next Hop object are explained as follows:

A value of the Object class is to be defined, and is managed by the IANA. When a value of the Object type (OT) is 1, a four-byte IPv4 unicast address is carried in the Object body. When a value of the Object type is 2, a 16-byte IPv6 unicast address is carried in the Object body. The Object class and the Object type jointly and uniquely determine the Next Hop object.

The Reserved field is padded with zeros during transmitting, and ignored during reception.

A Processing rule flag field and an Ignore flag field are not used in this Route object, and are set to zeros.

A value of the Object length is equal to a length of the Next Hop object, including an object header.

It should be understood that, the values and/or the lengths of the fields listed herein are merely used for illustrative description, and should not be construed as any limitation to this application. This embodiment of this application does not exclude a possibility that the Object type field has another value.

Step S303: The controller sends the first message to a network device.

Further, the controller sends the first message to the network device such that the network device stores the CRP routing entry information into the CRP routing table of the network device based on the first identification information, and directs packet forwarding based on the CRP routing table.

Optionally, the controller itself stores a CRP routing table. After determining the CRP routing entry information, the controller stores the CRP routing entry information into the CRP routing table stored in the controller.

Step S304: The network device receives the first message.

Step S305: The network device stores the CRP routing entry information into a CRP routing table of the network device.

Further, after receiving the first message, the network device identifies a need to store, based on the first identification information carried in the first message, the CRP routing entry information carried in the first message into the local CRP routing table, then stores the CRP routing entry information into the local CRP routing table, and directs packet forwarding based on the CRP routing table.

In a specific implementation, after receiving the first message, the network device searches the locally stored CRP routing table for an entry using the route prefix carried in the first message as a keyword. If a corresponding entry is hit, the CRP routing entry information is used to update corresponding information in the found entry. If no corresponding entry is hit, a new CRP routing entry is created, and the CRP routing entry information is stored in the created CRP routing entry.

According to the foregoing technical solutions, the CRP protocol is run between the controller and the forwarding device, and the separate CRP routing table is created on the forwarding device, and is used to store the CRP routing entry information sent by the controller. A preferred route in the CRP routing table is added to an RM RIB such that an RM module can select a route from routes generated using different routing protocols, such as the CRP route, an ISIS route, a BGP route, and an OSPF route. In addition, because the CRP route advertised by the controller and a route advertised using a routing protocol between the forwarding devices are stored in different routing tables, a routing policy related to the CRP route does not affect a related application of a routing policy embodied by a route in the routing protocol between the forwarding devices.

Optionally, the CRP routing entry information further includes route synchronization attribute information, where the route synchronization attribute information is used to, when the controller sends the route prefix, carry route attribute information defined by the controller.

The route synchronization attribute includes but is not limited to the route priority, the topology, and attribute information of a next hop.

The attribute information of the next hop includes at least one attribute information type of the next hop. The attribute information types of the next hop include but are not limited to an access type of the next hop, such as an IP network or a VXLAN, available bandwidth, a load balancing ratio, and the like.

In a specific implementation, in the foregoing embodiment in which the BGP update message is used to carry the CRP routing entry information, the first BGP update message further includes a Route Synchronization Attribute field. The Route Synchronization Attribute field carries the route synchronization attribute information. Optionally, the Route Synchronization Attribute field includes at least one sub-TLV field, and each route synchronization attribute information type corresponds to one of the at least one sub-TLV field. Each sub-TLV field includes a T field, an L field, and a V field, where the T field indicates any one of the route synchronization attribute information types, and the V field indicates content determined based on a corresponding route synchronization attribute information type. The route synchronization attribute information type includes the route priority.

In another specific implementation, in the foregoing embodiment in which the PCEP message is used to carry the CRP routing entry information, the first PCEP message further includes a PCEP Route Attribute object field, where the PCEP Route Attribute object field carries the route synchronization attribute information. Optionally, the PCEP Route Attribute object field includes at least one sub-TLV field, and each route synchronization attribute information type corresponds to one of the at least one sub-TLV field. Each sub-TLV field includes a T field, an L field, and a V field, where the T field indicates any one of the route synchronization attribute information types, and the V field indicates content determined based on a corresponding route synchronization attribute information type. The route synchronization attribute information type includes the route priority.

In the foregoing two implementations of carrying the route synchronization attribute information, specific content or specific values of the sub-TLV field may be set according to a specific situation of messages, for example, may be set in a same manner, or may be set in different manners. This is not limited in this application. In a specific embodiment, for example, when the T field is 1, it may indicate a route priority type, the L field has two bytes, and a value of the V field is a specific value of the route priority, for example, 3. For another example, when the T field is 2, it may indicate a topology type, the L field has two bytes, and the V field is a specific topology identifier, such as 1. When the T field is 3, it may indicate an available bandwidth type of the next hop, the L field has two bytes, and a value of the V field is a specific value of the available bandwidth, for example, 20,000 kilobits per second (kbit/sec). For another example, when the T field is 4, it may indicate a load balancing ratio type of a next hop, the L field has two bytes, and the V field is a specific load balancing ratio, for example, 50%, indicating that the next hop shares 50% of the load.

It should be understood that, the route synchronization attribute information type listed above is merely used for illustrative description, and should not be construed as any limitation to this application. A field used to carry the route synchronization attribute information is not limited to the foregoing Route Synchronization Attribute field or Route Attribute object field. The route synchronization attribute information may alternatively be carried using another existing or added field. This is not limited in this application. In addition, as listed herein, the type 1 type is a route priority type, a type 2 type is a topology type, a type 3 is an available bandwidth type of the next hop, and a type 4 is a load balancing ratio type of the next hop. This should not be construed as any limitation to this application either. This embodiment of this application does not exclude a possibility that the type 1 to the type 4 are used to indicate other types, or other manners are used to indicate the route priority type, the topology type, the available bandwidth type of the next hop, and the load balancing ratio type of the next hop. In addition, a quantity of route synchronization attribute information types is not limited in this embodiment of this application either.

Optionally, in this application, a next hop attribute field may be separately used to carry the attribute information of the next hop.

In a specific implementation, in the foregoing embodiment in which the BGP update message is used to carry the CRP routing entry information, the first BGP update message further includes a Next Hop Attribute field, where the Next Hop Attribute field carries the attribute information of the first next hop. Optionally, the Next Hop Attribute field includes at least one sub-TLV field, and each attribute information type of the next hop corresponds to one of the at least one sub-TLV field. Each sub-TLV field includes a T field, an L field, and a V field, where the T field indicates any one of the attribute information types of the next hop, and the V field indicates content determined based on a corresponding attribute information type of the next hop.

In another specific implementation, in the foregoing embodiment in which the PCEP message is used to carry the CRP routing entry information, the first PCEP message further includes a PCEP Next Hop Attribute object field, where the PCEP Next Hop Attribute object field carries the attribute information of the first next hop. Optionally, the PCEP Next Hop Attribute object field includes at least one sub-TLV field, and each attribute information type of the next hop corresponds to one of the at least one sub-TLV field. Each sub-TLV field includes a T field, an L field, and a V field, where the T field indicates any one of the attribute information types of the next hop, and the V field indicates content determined based on a corresponding attribute information type of the next hop.

In the foregoing two implementations of carrying the attribute information of the next hop using the Next Hop Attribute field, specific content or specific values of the TLV may be set according to a specific situation of messages, for example, may be set in a same manner, or may be set in different manners. This is not limited in this application. In this embodiment of this application, for example, when the T field is 1, it may indicate an available bandwidth type, the L field has two bytes, and a value of the V field is a specific value of the available bandwidth, for example, 20,000 kbit/sec. For another example, when the T field is 2, it may indicate a load balancing ratio type, the L field has two bytes, and the V field indicates a specific load balancing ratio, for example, 50%, indicating that the next hop shares 50% of the load.

It should be understood that, the attribute information type of the next hop listed above is merely used for illustrative description, and should not be construed as any limitation to this application. A field used to carry the attribute information of the next hop is not limited to the foregoing Next Hop Attribute field or Next Hop Attribute object field. The attribute information of the next hop may alternatively be carried using another existing or added field. This is not limited in this application. In addition, as listed herein, the type 1 type is an available bandwidth type, and the type 2 type is a load balancing ratio type. This should not be construed as any limitation to this application either. This embodiment of this application does not exclude a possibility that the type 1 and the type 2 are used to indicate other types, or other manners are used to indicate the available bandwidth type and the load balancing type. Moreover, a quantity of next hop attribute types is not limited in this embodiment of this application either.

In this application, the priority of the CRP route can be flexibly set by adding the route priority to the route attribute information. For example, the CRP route is set as a preferred route, thereby achieving an objective of controlling traffic using the route advertised by the controller. Subsequent various complex policy control over the route can be completed by upgrading the controller. This is unlike an existing routing policy such as a BGP routing policy, which requires all devices to implement complex policies. Therefore, traffic control is simpler and more flexible. In addition, in some application scenarios, if a customer considers that an internally deployed IGP route is trusted and should be preferentially selected, while an external route is untrusted and should not be preferentially selected, the priority of the CRP route may be set to be lower than priorities of the ISIS route and the OSPF route. It can be learned that different needs of the customer can be met by setting the priority of the CRP route.

Further, the attribute information of the next hop is carried in the route attribute information such that the network device can obtain the attribute information of the next hop from the CRP routing table, and send the attribute information of the next hop to the FIB in order to direct packet forwarding.

It should be noted that, when the CRP routing entry information includes the route synchronization attribute information, after receiving the first message, the network device stores the route synchronization attribute information into the CRP routing table as indicated by the first identification information. Further, when receiving the first message, the network device searches the CRP routing table using the route prefix carried in the first message as a keyword. If a corresponding entry is hit, the route synchronization attribute information is used to update corresponding information in the hit entry. If no corresponding entry is hit, a new entry is created, and the route synchronization attribute information is stored into the new entry.

Further, after receiving the first message, the network device stores the attribute information of the next hop in a local next hop table as indicated by the first identification information. Further, in addition to storing the attribute information of the first next hop into the CRP routing table, the network device further searches, using the address of the first next hop carried in the first message as a keyword, the next hop table stored in the network device. If a corresponding entry is hit, the attribute information of the next hop is used to update corresponding information in the found entry, or if no entry is hit, a new entry is created, and is used to store the address of the first next hop and the attribute information of the first next hop.

It should be noted that, when the route synchronization attribute information is not carried in the first message, the network device may perform processing using default values according to an existing rule. For example, an inter-protocol route selection priority is set to 1, bandwidth of the next hop is not limited, a load balancing ratio of the next hop is not set, and a type of the next hop is not specified.

For example, a format of the next hop table may be shown in Table 3.

TABLE 3

| Next-Hop | Type | Status | Band Width (Kbit/sec) | Weight | (Another field) |
|---|---|---|---|---|---|
| 1.1.1.1 | IP | 0xC0000000 | 20,000 | 100 | |
| 2.2.2.2 | VXLAN | 0xC0000000 | 40,000 | 100 | |

As shown in Table 3, the next hop table includes a plurality of entries of a next hop, and includes a plurality of fields:

Next-Hop field: indicates an address of a next hop.

Type field: indicates an access type of the next hop, such as an IP network or a VXLAN.

Status field: indicates a status of the next hop.

Band Width field: indicates available bandwidth of the next hop.

Weight field: indicates a load balancing ratio of the next hop. For calculation in percentage, 100 indicates that the next hop does not participate in load balancing.

In a specific implementation, the foregoing "Status" field may include 32 bits, and each bit indicates one status of the next hop. For example, an encapsulation format of the "Status" field is shown in Table 4:

TABLE 4

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| V | U | | | | | | | | | | | | | | |

V, namely, valid: 1 indicates that the next hop is a valid next hop, and 0 indicates that the next hop is an invalid next hop.

U, namely, used: 1 indicates that the next hop is in use, and 0 indicates that the next hop is not yet used.

Encoding of the Status is used as an example for description:

0xC0000000: Both the bits V and U are ones, indicating that the next hop is valid, and in use.

In this example, the foregoing two bits are used as an example to describe, with reference to this application, how to use the Status field in the next hop table. A person skilled in the art may understand that, in the foregoing two bits, 0 and 1 may indicate opposite meanings. For example:

V, namely, valid: 0 indicates that the next hop is a valid next hop, and 1 indicates that the next hop is an invalid next hop.

U, namely, used: 0 indicates that the next hop is in use, and 1 indicates that the next hop is not yet used.

Other numbers may be used to indicate the foregoing status information. This is not limited in this embodiment of this application.

A person skilled in the art may understand that, the Status field may alternatively be encapsulated in another encapsulation format. This is merely illustrative description, and should not be understood as a limitation to this application.

It should be noted that, the network device stores information about the next hop into the table separately maintained by the network device, and this table is referred to as "next hop table".

In a specific implementation, the network device maintains only one next hop table, and associates the next hop table with all routing tables maintained by the network device. Further, each next hop entry in the next hop table records a mapping relationship between an address of a next hop and attribute information of the next hop. However, the routing table records the mapping relationship between a route prefix and an address of a next hop. However, in the routing table, there may be a case in which a plurality of different route prefixes correspond to an address of a same next hop A. That is, a plurality of routing entries exist in the routing table, and the plurality of routing entries have different route prefixes, but correspond to the address of the same next hop A. However, in the network device, an entry also exists in the next hop table, and is used to record the address of the next hop A and attribute information of the next hop A. The network device associates the entry of the next hop A with all routing entries in the routing table that use the address of the next hop A.

The foregoing "all routing tables" include a plurality of routing tables of the network device that are used to store routes advertised using different protocols.

In another specific implementation, the network device separately maintains a plurality of next hop tables, and each next hop table corresponds to a routing table that stores a route advertised using each protocol. For example, a next hop table 1 corresponds to an ISIS routing table, and a next hop table 2 corresponds to a CRP routing table. To be specific, the plurality of next hop tables is associated with the plurality of routing tables respectively. That is, the plurality of next hop tables is in one-to-one mapping relationship with the plurality of routing tables.

For example, an address of a next hop may be used as an index to find all routing entries that use the address of the next hop. A person skilled in the art may understand that, a possibility that another field is used as an index to find a routing entry that corresponds to the address of the next hop is not excluded. This is merely illustrative description, and should not be understood as a limitation to this application.

Optionally, the network device stores a CRP table, and the CRP table includes the CRP routing table and the next hop table. The CRP table includes a plurality of CRP entries, and the CRP entry includes a CRP routing entry and an entry of the next hop.

It should be understood that, the entry information of the next hop listed in Table 3 is merely an example, but does not constitute a limitation to this application. In addition, although a plurality of types of information are listed in Table 3, a person skilled in the art may understand that, the entry information of the next hop may include one or more of the plurality of types of information, and does not necessarily include all information. Alternatively, the entry information of the next hop may include only information that is indicated by another field and that is not listed herein. This is not limited in this embodiment of this application.

Optionally, the method 300 may further include steps S306 to S310.

Step S306: The controller determines entry information of a second next hop of the network device.

The entry information of the second next hop records a mapping relationship between an address of the second next hop and attribute information of the second next hop. The address of the second next hop may be the same as the address of the first next hop, or may be different from the address of the first next hop.

Attribute information types of the second next hop include but are not limited to the following parameter types, an access type of a next hop, such as an IP or a VXLAN, available bandwidth, a load balancing ratio, and the like.

Step S307: The controller generates a second message, where the second message is used to send the entry information of the second next hop.

Further, the controller generates the second message, where the second message carries the entry information of the second next hop. The second message includes second identification information, and the second identification information is used to instruct the network device to store the entry information of the second next hop into the local next hop table. The entry information of the next hop may not necessarily include a route prefix such that the controller may separately send information about the next hop to the network device.

That the second identification information is used to instruct the network device to store the entry information of the second next hop into the local next hop table further includes the second identification information is used to instruct the network device to create a new entry or update the entry information of the second next hop in the next hop table.

In a specific implementation, the second message is a second BGP update message. The second BGP update message includes an MP_REACH_NLRI attribute field and a next hop attribute Next Hop Attribute field. The MP_REACH_NLRI attribute field includes an SAFI field, an NLRI field, and a next hop information field. The SAFI field indicates that the MP_REACH_NLRI attribute field is encapsulated based on an encapsulation format supported by a BGP synchronization address family, and carries the second identification information. The second identification information may be directly indicated by a SAFI value in the SAFI field. The NLRI field carries the address of the second next hop, or the next hop information field carries the address of the second next hop. Optionally, the NLRI field includes a TLV field, where a type T field of the TLV field indicates that a type of the TLV field is a next hop synchronization type, and a value V field of the TLV field carries the address of the second next hop. The Next Hop Attribute field carries the attribute information of the second next hop. Optionally, the Next Hop Attribute field includes at least one sub-TLV field, and each attribute information type of the next hop corresponds to one of the at least one sub-TLV field. Each sub-TLV field includes a T field, an L field, and a V field, where the T field indicates any one of attribute information types of the second next hop, and the V field indicates content determined based on a corresponding attribute information type of the second next hop.

In another specific implementation, the second message is a second PCEP message. The second PCEP message includes a Message-Type field, a Next Hop object field, and a Next Hop Attribute object field. The Message-Type field is used to carry the second identification information. The Next Hop object field carries the address of the second next hop. The Next Hop Attribute object field carries the attribute information of the second next hop. Optionally, the Next Hop Attribute object field includes at least one sub-TLV field, and each attribute information type of the next hop corresponds to one of the at least one sub-TLV field. Each sub-TLV field includes a T field, an L field, and a V field, where the T field indicates any one of the attribute information types of the next hop, and the V field indicates content determined based on a corresponding attribute information type of the next hop.

In this embodiment of this application, the Message-Type in the second PCEP message may be understood as a message type extended from the Message-Type in the existing PCEP protocol, and a value of the Message-Type may be determined based on the standard formulated by the IETF. A new value of the Message-Type is defined to indicate that the second PCEP message is a message used to update the next hop or create a new next hop. The second PCEP message may also be referred to as a PCE-initiated next hop message.

Optionally, the second identification information may be directly indicated by a Message-Type value in the Message-Type field.

Optionally, the second PCEP message further includes a status RP object field. That the Message-Type field is used to carry the second identification information further includes the Message-Type field and the RP object field jointly carry the second identification information. To be specific, the second identification information is indicated by both the Message-Type value in the Message-Type field and a value of an R flag in the RP object field.

Further, for an encapsulation format of the RP object and explanations to fields of the RP object, refer to related definitions in RFC 5440. The Message-Type field is used to indicate that the second PCEP message is a message used to separately send next hop information, and the next hop information includes at least the address of the next hop. When the R flag in the RP object is set to 0, the network device stores the entry information of the second next hop into the local next hop table. To be specific, the Message-Type field and the RP object field jointly carry the second identification information.

A person skilled in the art may understand that a field with which the Message-Type field is used to carry the second identification information is not limited to the foregoing RP object field, and the second identification information may alternatively be carried using another existing or added field. This is not limited in this application. In addition, the example herein in which the R flag is set to 0, and the network device stores the entry information of the second next hop into the local next hop table should not be construed as any limitation to this application either. This embodiment of this application does not exclude a possibility that when the R flag is set to 1 or another value, the network device stores the entry information of the second next hop.

In the foregoing two implementations of carrying the attribute information of the next hop, specific content or specific values of the TLV may be set according to a specific situation of messages, for example, may be set in a same manner, or may be set in different manners. This is not limited in this application. In a specific embodiment, for example, when the T field is 1, it may indicate an available bandwidth type, the L field has two bytes, and a value of the V field is a specific value of the available bandwidth, for example, 20,000 kbit/sec. For another example, when the T field is 2, it may indicate a load balancing ratio type, the L field has two bytes, and the V field indicates a specific load balancing ratio, for example, 50%, indicating that the next hop shares 50% of the load.

It should be understood that, the attribute information type of the next hop listed above is merely used for illustrative description, and should not be construed as any limitation to this application. A field used to carry the attribute information of the next hop is not limited to the foregoing Next Hop Attribute field or Next Hop Attribute object field. The attribute information of the next hop may alternatively be carried using another existing or added field. This is not limited in this application. In addition, as listed herein, the type 1 type is an available bandwidth type, and the type 2 type is a load balancing ratio type. This should not be construed as any limitation to this application either. This embodiment of this application does not exclude a possibility that the type 1 and the type 2 are used to indicate other types, or other manners are used to indicate the available bandwidth type and the load balancing type. Moreover, a quantity of attribute information types of a next hop is not limited in this embodiment of this application either.

Step S308: The controller sends the second message to the network device.

Further, the controller sends the second message to the network device such that the network device stores the entry information of the second next hop into the next hop table of the network device based on the second identification information.

Optionally, the controller itself stores a next hop table, and after determining the entry information of the second next hop, the controller stores the entry information of the second next hop into the next hop table stored in the controller.

Step S309: The network device receives the second message.

Step S310: The network device stores the entry information of the second next hop into the next hop table.

In a specific implementation, that the network device stores the entry information of the second next hop into the next hop table further includes after receiving the second message, the network device searches, using the address of the second next hop carried in the second message as a keyword, the next hop table stored in the network device for an entry, and if a corresponding entry is hit, the entry information of the second next hop is used to update the found entry, or if no entry is hit, a new entry for the next hop is created, and the entry information of the second next hop is stored into the created entry of the next hop.

It should be noted that, when the attribute information of the second next hop is not carried in the second message, the network device may perform processing using default values according to an existing rule. For example, bandwidth of the next hop is not limited, a load balancing ratio of the next hop is not set, and an access type of the next hop is not specified.

According to the technical solutions provided in this embodiment, the controller can separately send next hop information to the forwarding device, thereby implementing separate management on the next hop information of the forwarding device by the controller. The separate management includes separately creating a new entry or updating the next hop information without a need to bind the route prefix. According to the foregoing solutions, next hop management of the forwarding device by the controller is more flexible, system resources occupied because the route prefix is carried in information exchange between the controller and the forwarding device are effectively saved, information that needs to be parsed by the forwarding device is reduced, and service processing efficiency of the forwarding device is also improved.

Further, when the controller separately sends the next hop information to the forwarding device, the controller-customized attribute information of the next hop is carried such that the network device can obtain the attribute information of the next hop from the next hop table, and send the attribute information of the next hop to the FIB in order to direct packet forwarding.

Optionally, the method 300 may further include steps S311 to S315.

Step S311: The controller generates a third message.

The third message carries an address of a third next hop of the network device, the third message includes third identification information, and the third identification information is used to instruct the network device to delete, from the locally stored next hop table, an entry that is of the third next hop and that corresponds to the address of the third next hop.

In a specific implementation, the third message is a third BGP update message.

The third BGP update message includes an MP_UN-REACH_NLRI attribute field. The MP_UNREACH_NLRI attribute field includes a SAFI field and an unreachable NLRI field. The SAFI field indicates that the MP_UN-REACH_NLRI attribute field is encapsulated based on an encapsulation format supported by a BGP synchronization address family, and carries the third identification information. The third identification information is directly indicated by a SAFI value in the SAFI field of the BGP synchronization address family. The unreachable NLRI field carries the address of the third next hop, or the next hop information field carries the address of the third next hop.

Figure 12:
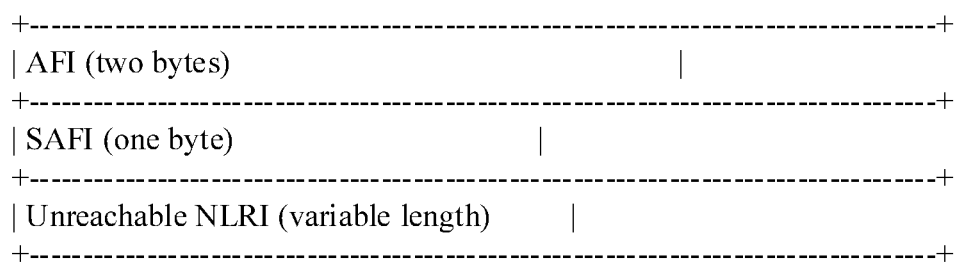
FIG. 12 is a schematic diagram of an MP_UNREACH_NLRI field encapsulated based on an encapsulation format supported by a BGP synchronization address family according to an embodiment of this application.

An encapsulation format that is of the MP_UNREACH_NLRI and that is added based on the BGP synchronization address family is shown in FIG. 12.

The MP_UNREACH_NLRI may be understood as multiprotocol extension attribute information of the unreachable NLRI, and includes two parts, an AFI field and an unreachable NLRI field.

For related description of the AFI field, refer to related description of FIG. 4. Details are not described herein again.

The unreachable NLRI field includes an unreachable NLRI field.

In a specific implementation, the unreachable NLRI field may be identified by a 2-tuple (Length-Next Hop). Length: indicates a length of an address field of a next hop, in units of bytes. Next Hop: includes an address of the next hop, and is followed by trailing bits, which are used to ensure that the end of the field complies with a byte boundary, and values of the trailing bits have no meaning.

In another specific implementation, the unreachable NLRI field may include a TLV field (variable length). For a schematic diagram of the TLV field, refer to FIG. 5. A type T field indicates that a type of the TLV field is a BGP synchronization type, a length L field indicates a length of a V field, and the value V field carries content determined based on the BGP synchronization type. In this embodiment of this application, a value 2 of the T field may indicate a next hop synchronization type. Optionally, a value of the L field is 16 bits, namely, two bytes, indicating a specific length value of the V field. For example, when a value of the L field is 4, the V field indicates a four-byte IPv4 address, when a value of the L field is 16, the V field indicates a 16-byte IPv6 address, or the V field indicates a two-byte address of the next hop.

It should be understood that, the example herein in which the type 2 is the next hop synchronization type is merely used for illustrative description, and should not be construed as any limitation to this application. This embodiment of this application does not exclude a possibility that the type 2 is used to indicate another type, or another manner is used to indicate the next hop synchronization type. In addition, a quantity of types of the NLRI type is not limited in this embodiment of this application either.

In another specific implementation, the third message is a third PCEP message. The third PCEP message includes a Message-Type field and a Next Hop object field. The Message-Type field indicates that the third PCEP message is used to send the address of the third next hop to the network device, and is used to carry the third identification information. The third identification information may be directly indicated by a Message-Type value in the Message-Type field. The Next Hop object field carries the address of the third next hop.

An encapsulation format of the third PCEP message is the same as the encapsulation format of the second PCEP message. For specific description, refer to related description of the encapsulation format of the second PCEP message described above.

In this embodiment of this application, the Message-Type in the third PCEP message may be understood as a message type extended from the Message-Type in the existing PCEP protocol, and a value of the Message-Type may be determined based on the standard formulated by the IETF.

In a specific implementation, the third identification information is carried based on the extended Message-Type, and is used to instruct the network device to delete, from the locally stored next hop table, the entry that is of the third next hop and that corresponds to the address of the third next hop. The third identification information is directly indicated by a Message-Type value in the Message-Type field. The third PCEP message may also be referred to as a PCE-initiated next hop message.

In another specific implementation, the third PCEP message further includes a status RP object field. That the Message-Type field carries the third identification information includes the Message-Type field and the RP object field jointly carry the third identification information. To be specific, the third identification information is indicated by both the Message-Type value in the Message-Type field and a value of an R flag in the RP object field.

Further, for explanations to fields of the RP object, refer to related definitions in RFC 5440. The Message-Type field is used to indicate that the third PCEP message is a message used to send the address of the third next hop. When the R flag in the RP object is set to 1, the network device deletes, from the locally stored next hop table, the entry that is of the third next hop and that corresponds to the address of the third next hop. To be specific, the Message-Type field and the RP object field jointly carry the third identification information.

A person skilled in the art may understand that a field with which the Message-Type field is used to carry the third identification information is not limited to the foregoing RP object field, and the third identification information may alternatively be carried using another existing or added field. This is not limited in this application. In addition, the example herein in which the R flag is set to 1, and the network device deletes, from the locally stored next hop table, the entry that is of the third next hop and that corresponds to the address of the third next hop should not be construed as any limitation to this application either. Alternatively, the network device deletes the entry of the third next hop when the R flag is set to 0 or another value. This embodiment of this application does not exclude a possibility that when the R flag is set to 0 or another value, the network device deletes the entry of the third next hop.

Step S312: The controller sends the third message to the network device.

Step S313: The network device receives the third message.

Step S314: The network device deletes an entry of the third next hop from the locally stored next hop table as indicated by the third identification information.

Further, after receiving the third message, the network device searches, using the address of the third next hop carried in the third message as a keyword, the next hop table stored in the network device for an entry. If the entry of the third next hop is hit, the entry of the third next hop is deleted from the next hop table. If no corresponding entry is hit, the processing ends.

Optionally, the method further includes the following steps.

Step S315: The network device deletes a routing entry associated with an address of the third next hop.

Further, a plurality of routing tables is stored in the network device. Each routing table may record a routing entry that is associated with the address of the third next hop. When the network device determines that the address of the third next hop is unavailable, the network device may find, using the address of the third next hop as an index, all routing entries that use the address of the third next hop, and delete all the routing entries that are associated with the address of the third next hop.

According to the technical solutions provided in this embodiment, when a plurality of route prefixes corresponds to a same next hop, a plurality of routing entries that use the next hop can be deleted by deleting the next hop corresponding to the plurality of route prefixes. Therefore, only one message needs to be sent between the controller and the forwarding device, to achieve an objective of quickly deleting routing entries in batches. Therefore, a quantity of messages exchanged between the controller and the forwarding device is greatly reduced, thereby saving system resources, and improving service processing efficiency.

It should be noted that, an execution sequence of steps S301 to S305, S306 to S310, and S311 to S315 is not limited. For example, steps S306 to S310 may be performed before steps S301 to S305, or may be performed after steps S301 to S305. S311 to S315 may be performed before steps S306 to S310, or may be performed after steps S306 to S310.

Optionally, the method 300 may further include steps S316 to S318.

Step S316: The network device generates a fourth message.

The fourth message carries route status report information, where the route status report information records a mapping relationship between the route prefix and status information of the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop. Status information (such as a status of a next hop, for example, whether a next hop is valid or whether a next hop is already in use, a bandwidth occupation ratio of a next hop, a packet loss rate of a next hop, a packet sending delay of a next hop, and a survival time of a next hop) related to the next hop may also be carried in next hop status report information that is described in the following step 319. For details, refer to the following description.

In a specific implementation, the fourth message is a fourth BGP update message. The fourth BGP update message includes an MP_REACH_NLRI attribute field and a Route Status Report Attribute field. The MP_REACH_NLRI attribute field includes an NLRI field. The NLRI field is used to carry the route prefix. The Route Status Report Attribute field is used to carry the status information of the CRP route. Optionally, the Route Status Report Attribute field includes at least one sub-TLV field, and each status information type of the CRP route corresponds to one of the at least one sub-TLV field. Each sub-TLV field includes a T field, an L field, and a V field, where the T field indicates any one of status information types of the CRP route, and the V field indicates content determined based on a corresponding status information type of the CRP route.

In another specific implementation, the fourth message is a fourth PCEP message. The fourth PCEP message includes a Message-Type field, a Route object field, and a Route Status Report Attribute object field. The Message-Type field indicates that the fourth PCEP message is used to send the route status report information to the controller. The Route object field carries the route prefix. The Route Status Report Attribute object field carries the status information of the CRP route. Optionally, the Route Status Report Attribute object field includes at least one sub-TLV field, and each status information type of the CRP route corresponds to one of the at least one sub-TLV field. Each sub-TLV field includes a T field, an L field, and a V field, where the T field indicates any one of status information types of the CRP route, and the V field indicates content determined based on a corresponding status information type of the CRP route.

In this embodiment of this application, for example, when a value of the T field is 1, it may indicate a current route status type of the CRP route, the L field has two bytes, and the V field indicates specific content of the current route status of the CRP route, for example, whether the current route is valid, preferentially selected, or activated.

It should be understood that, the example herein in which the type 1 type is the current route status type of the CRP route is merely used for illustrative description, and should not be construed as any limitation to this application. This embodiment of this application does not exclude a possibility that the type 1 is used to indicate another type, or another manner is used to indicate the current route status type of the CRP route. In addition, a quantity of types of the TLV type is not limited in this embodiment of this application either.

In a specific implementation, the network device has a locally stored route status report information table, which is used to store the route status report information. Optionally, the CRP table includes the route status report information table. For example, the route status report information table is shown in Table 5.

TABLE 5

| Network | Next-Hop | Status | Age | Band Width | (Another field) |
| --- | --- | --- | --- | --- | --- |
| 1.1.1.0/24 | 1.1.1.1 | 0x80000000 | 00:17:49 | | |
| 1.1.1.2/32 | 1.1.1.1 | 0x80000000 | 00:17:49 | | |
| 2.2.2.0/24 | 2.2.2.2 | 0x80000000 | 00:00:07 | | |
| 2.2.2.2/32 | 2.2.2.2 | 0x80000000 | 00:00:07 | | |
| 5.1.1.0/24 | 1.1.1.1 | 0xD0000000 | 00:17:49 | | |
| 6.1.1.0/24 | 2.2.2.2 | 0xD0000000 | 00:00:07 | | |
| 100.1.1.0/24 | 1.1.1.1 | 0xC0000000 | 00:17:49 | | |

As shown in FIG. 5, the route status report information table includes a plurality of fields, and the fields are explained as follows:

Network field: indicates the route prefix.

Next-Hop field: indicates an address of a next hop.

Status field: indicates a route status.

Age field: indicates a survival time of a current route.

Band Width field: indicates available bandwidth of the next hop.

For an encapsulation format and related description of the Status field, refer to Table 2 and related description of Table 2. Details are not described herein again.

It should be understood that, the plurality of types of status information listed in Table 5 are merely an example, but do not constitute a limitation to this application. In addition, although the plurality of types of status information are listed in Table 5, a person skilled in the art may understand that, the route status report information may include one or more of the plurality of types of status information, and does not necessarily include all status information. Alternatively, the route status report information may include only status information that is indicated by another field and that is not listed herein. This is not limited in this embodiment of this application.

Step S317: The network device sends the fourth message to the controller.

In a specific implementation, the network device periodically reports the status information of the CRP route. For example, when a system runs stably, according to configuration or negotiation, the network device reports the status information of the route such as traffic statistical information and bandwidth usage information to the controller once every 180 seconds.

In another specific implementation, the network device reports the status information of the route in real time. For example, when an important event occurs in the system, for example, an entry corresponding to routing information is changed from "preferred" to "not preferred", or when unsuccessful routing entry iterated tunneling or the like occurs, the network device reports the status information of the route to the controller.

Step S318: The controller receives the fourth message.

The controller updates statistical information of the route prefix based on the received route status report information, to use updated statistical information as a basis for re-calculating the CRP route.

According to the foregoing technical solutions, the controller can obtain, periodically or in real time, route status information reported by the forwarding device, to learn a status of the forwarding device in real time, and use the route status information as a basis for adjusting the route, thereby improving traffic control reliability and realtimeness.

Optionally, the method 300 may further include steps S319 to S321.

Step S319: The network device generates a fifth message.

The fifth message carries next hop status report information, and the next hop status report information records a mapping relationship between an address of a fourth next hop and status information of the fourth next hop.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

In a specific implementation, the fifth message is a fifth BGP update message. The fifth BGP update message includes an MP_REACH_NLRI attribute field and a next hop status report attribute Next Hop Status Report Attribute field. The MP_REACH_NLRI attribute field includes an NLRI field. The NLRI field is used to carry the address of the fourth next hop. The Next Hop Status Report Attribute field is used to carry the status information of the fourth next hop. Optionally, the Next Hop Status Report Attribute field includes at least one sub-TLV field, and each status information type of the next hop corresponds to one of the at least one sub-TLV field. Each sub-TLV field includes a T field, an L field, and a V field, where the T field indicates any one of status information types of the next hop, and the V field indicates content determined based on a corresponding status information type of the next hop.

In another specific implementation, the fifth message is a fifth PCEP message. The fifth PCEP message includes a Message-Type field, a Next Hop object field, and a Next Hop Status Report Attribute object field. The Message-Type field indicates that the fifth PCEP message is used to send the next hop status report information to the controller. The Next Hop object field carries the address of the fourth next hop. The Next Hop Status Report Attribute object field carries the status information of the fourth next hop. Optionally, the Next Hop Status Report Attribute object field includes at least one sub-TLV field, and each status information type of the next hop corresponds to one of the at least one sub-TLV field. Each sub-TLV field includes a T field, an L field, and a V field, where the T field indicates any one of status information types of the next hop, and the V field indicates content determined based on a corresponding status information type of the next hop.

In this embodiment of this application, for example, when a value of the T field is 1, it may indicate a current status type of the next hop, the L field has two bytes, and the V field indicates specific content of the status of the next hop, for example, whether the current route is valid, preferentially selected, or activated.

It should be understood that, the example herein in which the type 1 type is the current status type of the next hop is merely used for illustrative description, and should not be construed as any limitation to this application. This embodiment of this application does not exclude a possibility that the type 1 is used to indicate another type, or another manner is used to indicate the current status type of the next hop. In addition, a quantity of types of the TLV type is not limited in this embodiment of this application either.

In another specific implementation, the network device has a locally stored next hop status report information table, which is used to store the next hop status report information. Optionally, the CRP table includes the next hop status report information table. For example, the next hop status report information table is shown in Table 6.

TABLE 6

| Next-Hop | Type | Status | Weight | Band Width Ratio | Loss (packet) | Delay | (Another field) |
|---|---|---|---|---|---|---|---|
| 1.1.1.1 | IP | 0xC0000000 | 100 | 45 | 10 | 15 | |
| 2.2.2.2 | GRE | 0xC0000000 | 100 | 60 | 0 | 20 | |

As shown in Table 6, the next hop status report information table includes a plurality of fields, and the fields are explained as follows:

Next-Hop field: indicates a network address of a next hop.
Type field: indicates a type of the next hop.
Status field: indicates a status of the next hop.
Band Width field: indicates available bandwidth of the next hop.
Weight field: indicates a load balancing ratio of the next hop.
Loss field: indicates a quantity of lost packets.
Delay field: indicates a delay in units of microseconds.
For an encapsulation format and related description of the Status field, refer to Table 4 and related description of Table 4. Details are not described herein again.

It should be understood that, the plurality of types of status information listed in Table 6 are merely an example, but do not constitute a limitation to this application. In addition, although the plurality of types of status information are listed in Table 6, a person skilled in the art may understand that, the next hop status report information may include one or more of the plurality of types of status information, and does not necessarily include all status information. Alternatively, the next hop status report information may include only other status information that is indicated by another field and that is not listed herein. This is not limited in this embodiment of this application.

Step S320: The network device sends the fifth message to the controller.

In a specific implementation, the network device periodically reports status information of the next hop. For example, when the system runs stably, it is determined through configuration or negotiation that the network device reports status information of the next hop such as traffic statistical information and bandwidth usage information to the controller once every 180 seconds.

In another specific implementation, the network device reports status information of the next hop in real time. For example, when an important event occurs in the system, for example, an entry corresponding to the next hop information is changed from "reachable" to "unreachable", or a bandwidth usage ratio of an egress link corresponding to the next hop exceeds a threshold value (for example, 90%), the network device reports the status information of the next hop to the controller.

Step S321: The controller receives the fifth message.
The controller updates statistical information of the next hop information of the network device based on the received next hop status report information, to use updated statistical information as a basis for re-calculating the next hop information.

According to the foregoing technical solutions, the controller can obtain, periodically or in real time, the status information of the next hop reported by the forwarding device, to learn a status of the forwarding device in real time, and use the status information of the next hop as a basis for calculating and adjusting a next hop, thereby improving traffic control reliability and realtimeness.

It should be noted that, an execution sequence of steps S301 to S305, S306 to S310, S311 to S315, S316 to S318, and S319 to S321 is not limited.

The foregoing describes, in detail with reference to FIG. 2 to FIG. 12, the information synchronization method provided in this embodiment of this application. The following describes, in detail with reference to FIG. 13 to FIG. 16, an apparatus and a system for information synchronization according to embodiments of this application.

Figure 13:
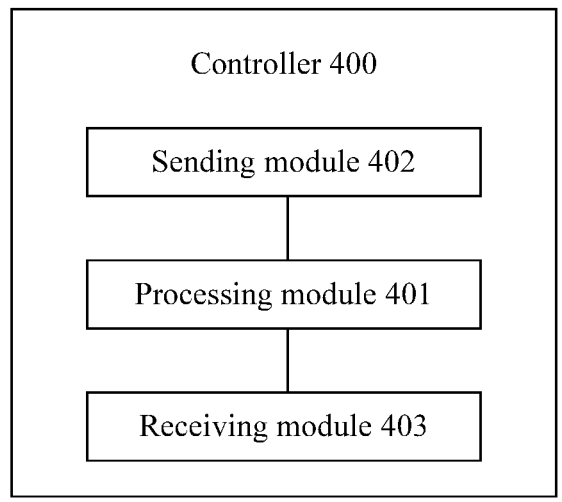
FIG. 13 is a schematic diagram of a controller according to an embodiment of this application.

FIG. 13 is a schematic diagram of a controller 400 according to an embodiment of this application. The controller 400 may be the controller 110 in FIG. 2, and may be configured to perform the method shown in FIG. 3A and FIG. 3B. As shown in FIG. 13, the controller 400 includes a processing module 401 and a sending module 402.

The processing module 401 is configured to determine CRP routing entry information, where the CRP routing entry information includes a mapping relationship between a route prefix and an address of a first next hop. The processing module 401 is further configured to generate a first message, where the first message carries the CRP routing entry information, and is used to advertise a CRP route. The first message includes first identification information, and the first identification information is used to instruct a network device to store the CRP routing entry information into a CRP routing table of the network device.

The sending module 402 is configured to send the first message to the network device such that the network device stores the CRP routing entry information into the CRP routing table based on the first identification information, and directs packet forwarding based on the CRP routing table.

In a specific implementation, the first message is a first BGP update message. The first BGP update message includes an MP_REACH_NLRI attribute field. The MP_REACH_NLRI attribute field includes an SAFI field, an NLRI field, and a next hop information field. The SAFI field indicates that the MP_REACH_NLRI attribute field is encapsulated based on an encapsulation format supported by a BGP synchronization address family, and carries the first identification information. The NLRI field carries the route prefix. Optionally, the NLRI field includes a TLV field, where a type T field of the TLV field indicates that a type of the TLV field is a BGP route synchronization type, a value V field of the TLV field carries the route prefix, and the next hop information field carries the address of the first next hop.

The first identification information may be directly indicated by a SAFI value in the SAFI field.

In another specific implementation, the first message is a first PCEP message. The first PCEP message includes a Message-Type field, a Route object field, and a Next Hop object field. The Message-Type field carries the first identification information, the Route object field carries the route prefix, and the Next Hop object field carries the address of the first next hop.

The first identification information may be directly indicated by a Message-Type value in the Message-Type field.

Therefore, according to the controller provided in this embodiment of this application, the CRP protocol is run between the controller and the network device, and the separate CRP routing table is created on the network device, and is used to store the CRP routing entry information sent by the controller. A preferred route in the CRP routing table is added to an RM RIB such that an RM module can select a route from routes generated using different routing protocols, such as the CRP route, an ISIS route, a BGP route, and an OSPF route. In addition, because the CRP route advertised by the controller and a route advertised using a routing protocol between forwarding devices are stored in different routing tables, a routing policy related to the CRP route does not affect a related application of a routing policy embodied by a route in the routing protocol between the forwarding devices.

Optionally, the CRP routing entry information further includes route synchronization attribute information, where the route synchronization attribute information is used to when the controller sends the route prefix, carry route attribute information defined by the controller.

The route synchronization attribute includes but is not limited to the route priority, the topology, and attribute information of a next hop.

Attribute information of the first next hop includes one or more of the following attribute information types of a next hop, bandwidth, a load balancing ratio, and a type of the next hop.

In a specific implementation, in the foregoing embodiment in which the BGP update message is used to carry the CRP routing entry information, the first BGP update message further includes a Route Synchronization Attribute field, used to carry the route synchronization attribute. For a specific carrying manner, namely, a message structure, a field format, or the like, refer to description of a corresponding part in the foregoing method embodiment. Details are not described herein again.

In another specific implementation, in the foregoing embodiment in which the PCEP message is used to carry the CRP routing entry information, the first PCEP message further includes a PCEP Route Attribute object field, used to carry the route synchronization attribute. For a specific carrying manner, namely, a used message format, a used field format, and the like, refer to description of a corresponding part in the foregoing method embodiment. Details are not described again.

In the foregoing two implementations of carrying the route synchronization attribute information, specific content or specific values of the TLV may be set according to a specific situation of messages, for example, may be set in a same manner, or may be set in different manners. This is not limited in this application.

It should be noted that, when the route synchronization attribute information is not carried in the first message, the network device may perform processing using default values according to an existing rule. For example, an inter-protocol route selection priority is set to 1, bandwidth of the next hop is not limited, a load balancing ratio of the next hop is not set, and a type of the next hop is not specified.

A priority of the CRP route can be flexibly set by adding the route priority to the route attribute information. For example, the CRP route is set as a preferred route, thereby achieving an objective of controlling traffic using the route advertised by the controller. Subsequent various complex policy control over the route can be completed by upgrading the controller. This is unlike an existing routing policy such as a BGP routing policy, which requires all devices to implement complex policies. Therefore, traffic control is simpler and more flexible. In addition, in some application scenarios, if a customer considers that an internally deployed IGP route is trusted and should be preferentially selected, while an external route is untrusted and should not be preferentially selected, the priority of the CRP route may be set to be lower than priorities of the ISIS route and the OSPF route. It can be learned that different needs of the customer can be met by setting the priority of the CRP route.

Optionally, in this application, a next hop attribute field may be separately used to carry the attribute information of the next hop.

In a specific implementation, in the foregoing embodiment in which the BGP update message is used to carry the CRP routing entry information, the first BGP update message further includes a Next Hop Synchronization Attribute field, used to carry the attribute information of the next hop. For a specific carrying manner, namely, a used message format, or a used field format (for example, used fields or extension fields), refer to description of a corresponding part in the foregoing method embodiment. Details are not described herein again.

In another specific implementation, in the foregoing embodiment in which the PCEP message is used to carry the CRP routing entry information, the first PCEP message further includes a PCEP Next Hop Attribute object field, used to carry the attribute information of the next hop. For a specific carrying manner, namely, a used message format, and a used field format (for example, used fields or extension fields), refer to description of a corresponding part in the foregoing method embodiment. Details are not described herein again.

The attribute information of the next hop is carried in the CRP routing entry information such that the network device can obtain the attribute information of the next hop from the CRP routing table, and send the attribute information of the next hop to a FIB in order to direct packet forwarding.

Optionally, the processing module 401 is further configured to generate a second message. The second message carries entry information of a second next hop of the network device, and the entry information of the second next hop records a mapping relationship between an address of the second next hop of the network device and attribute information of the second next hop. The second message includes second identification information, and the second identification information is used to instruct the network device to store the entry information of the second next hop into a next hop table of the network device.

The sending module 402 is further configured to send the second message to the network device such that the network device stores the entry information of the second next hop into the next hop table of the network device based on the second identification information.

In a specific implementation, the second message is a second BGP update message, and is used to carry the entry information of the second next hop. For a used specific message format, or a used specific field format (for example, used fields or extension fields), refer to description of a corresponding part in the foregoing method embodiment.

Details are not described herein again. In another specific implementation, the second message is a second PCEP message, and is used to carry the entry information of the second next hop. For a used specific message format, or a used specific field format (for example, used fields or extension fields), refer to description of a corresponding part in the foregoing method embodiment. Details are not described herein again.

Therefore, the controller can separately send next hop information to the network device, thereby implementing separate management on the next hop information of the network device by the controller. The separate management includes separately creating a new entry or updating the next hop information without a need to bind the route prefix. According to the foregoing solutions, next hop management on the network device by the controller is more flexible, system resources occupied because the route prefix is carried in information exchange between the controller and the network device are effectively saved, information that needs to be parsed by the network device is reduced, and service processing efficiency of the network device is also improved.

Further, when the controller separately sends the next hop information to the network device, a controller-customized attribute information of the next hop is carried such that the network device can obtain the attribute information of the next hop from the next hop table, and send the attribute information of the next hop to the FIB in order to direct packet forwarding.

Optionally, the processing module 401 is further configured to generate a third message, where the third message carries an address of a third next hop of the network device, the third message includes third identification information, and the third identification information is used to instruct the network device to delete, from the locally stored next hop table, an entry that is of the third next hop and that corresponds to the address of the third next hop.

The sending module 402 is further configured to send the third message to the network device such that the network device deletes the entry of the third next hop as indicated by the third identification information.

In a specific implementation, the third message is a third BGP update message, and is used to delete the entry of the third next hop. For a used specific message format, or a used specific field format (for example, used fields or extension fields), refer to description of a corresponding part in the foregoing method embodiment. Details are not described herein again.

In another specific implementation, the third message is a third PCEP message, and is used to delete the entry of the third next hop. For a used specific message format, or a used specific field format (for example, used fields or extension fields), refer to description of a corresponding part in the foregoing method embodiment. Details are not described herein again.

Therefore, when a plurality of routing entries correspond to a same next hop, the plurality of routing entries that use the next hop can be deleted by deleting the next hop corresponding to the plurality of routing entries. Therefore, only one message needs to be sent between the controller and the network device to achieve an objective of quickly deleting routing entries in batches. Therefore, a quantity of messages exchanged between the controller and the network device is greatly reduced, thereby saving system resources, and improving service processing efficiency.

In a specific implementation, the controller 400 further includes a receiving module 403. The receiving module 403 is configured to receive a fourth message sent by the network device, where the fourth message carries route status report information, and the route status report information records a mapping relationship between the route prefix and status information of the CRP route.

The processing module 401 is further configured to update statistical information of the route prefix based on the received route status report information, to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, route status information reported by the network device, to learn a route status of the network device in real time, and use the route status information as a basis for adjusting the route, thereby improving traffic control reliability and realtimeness.

Optionally, the receiving module 403 is further configured to receive a fifth message sent by the network device, where the fifth message carries next hop status report information, and the next hop status report information records a mapping relationship between an address of a fourth next hop and status information of the fourth next hop.

The processing module 401 is further configured to update statistical information of the fourth next hop based on the received next hop status report information, to use updated statistical information as a basis for re-calculating a next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, the status information of the next hop reported by the forwarding device to learn a status of the forwarding device in real time, and use the status information of the next hop as a basis for calculating and adjusting a next hop, thereby improving traffic control reliability and realtimeness.

The controller 400 according to this embodiment of this application may correspond to the controller in the information synchronization method 300 in the embodiments of this application. In addition, the foregoing and other operations and/or functions of modules in the controller 400 are respectively used to implement corresponding procedures of the method 300 in FIG. 3A and FIG. 3B. For brevity, details are not described herein again.

Figure 14:
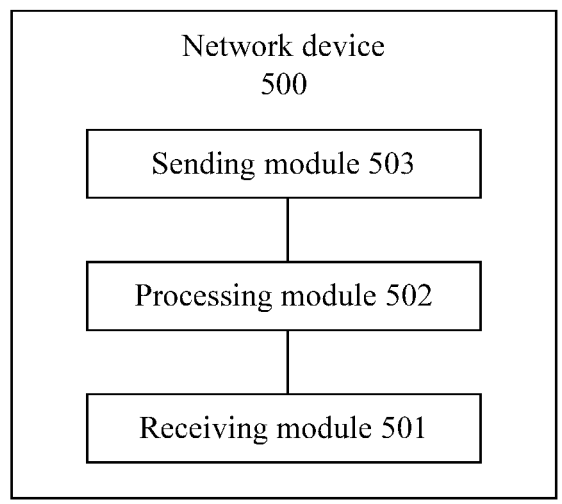
FIG. 14 is a schematic diagram of a network device according to an embodiment of this application.

FIG. 14 is a schematic diagram of a network device 500 according to an embodiment of this application. The network device 500 may be configured to perform the method shown in FIG. 3A and FIG. 3B. As shown in FIG. 14, the network device 500 includes a receiving module 501 and a processing module 502.

The receiving module 501 is configured to receive a first message sent by a controller, where the first message carries CRP routing entry information determined by the controller, and is used to advertise a CRP route, the CRP routing entry information records a mapping relationship between a route prefix and an address of a first next hop, and the first message includes first identification information.

The processing module 502 is configured to store the CRP routing entry information into a local CRP routing table as indicated by the first identification information, and direct packet forwarding based on the CRP routing table.

The CRP protocol is run between the controller and the network device, and the separate CRP routing table is created on the network device, to store the CRP routing entry information sent by the controller. Because the CRP route advertised by the controller and a route advertised using a routing protocol between network devices are stored in different routing tables, a routing policy related to the CRP route does not affect a related application of a routing policy embodied by a route in the routing protocol between the network devices.

Optionally, the CRP routing entry information further includes route synchronization attribute information, where the route synchronization attribute information is used to, when the controller sends the route prefix, carry route attribute information defined by the controller.

The route synchronization attribute includes but is not limited to the route priority, the topology, and attribute information of a next hop.

Attribute information of the first next hop includes one or more of the following attribute information types of a next hop, bandwidth, a load balancing ratio, and a type of the next hop.

The priority of the CRP route may be flexibly set by adding the route priority to the CRP routing entry information. For example, the CRP route is set as a preferred route, thereby achieving an objective of controlling traffic using the route advertised by the controller. Subsequent various complex policy control over the route can be completed by upgrading the controller. This is unlike an existing routing policy such as a BGP routing policy, which requires all devices to implement complex policies. Therefore, traffic control is simpler and more flexible. In addition, in some application scenarios, if a customer considers that an internally deployed IGP route is trusted and should be preferentially selected, while an external route is untrusted and should not be preferentially selected, the priority of the CRP route may be set to be lower than priorities of an ISIS route and an OSPF route. It can be learned that different needs of the customer can be met by setting the priority of the CRP route.

Optionally, the processing module 502 is further configured to store the address of the first next hop and the attribute information of the first next hop into an entry of the first next hop in a next hop table of the network device, where the entry of the first next hop records a mapping relationship between the address of the first next hop and the attribute information of the first next hop.

The address of the next hop and the attribute information of the next hop that is mapped thereto are stored into the next hop table of the network device, and the network device can implement separate management on the next hop. For example, entry information of a next hop in the next hop table is separately deleted, to delete all routing entries that are associated with the next hop in order to achieve an objective of deleting routing entries in batches. A quantity of messages exchanged between the controller and the network device can be effectively reduced, thereby saving system resources, and improving service processing efficiency.

Further, optionally, the processing module 502 is further configured to obtain the attribute information of the first next hop, and send the attribute information of the first next hop to an FIB in order to direct packet forwarding.

Optionally, the receiving module 501 is further configured to receive a second message sent by the controller, where the second message carries entry information of a second next hop of the network device, the entry information of the second next hop records a mapping relationship between an address of the second next hop of the network device and attribute information of the second next hop, and the second message includes second identification information.

The processing module 502 is further configured to store the entry information of the second next hop into the next hop table of the network device as indicated by the second identification information.

Therefore, by receiving next hop information separately sent by the controller, the network device can separately create a new entry or update the next hop information without a need to bind the route prefix. According to the foregoing solutions, next hop management on the network device by the controller is more flexible, system resources occupied because the route prefix is carried in information exchange between the controller and the network device are effectively saved, information that needs to be parsed by the network device is reduced, and service processing efficiency of the network device is also improved.

Optionally, the processing module 502 is further configured to obtain the attribute information of the second next hop, and send the attribute information of the second next hop to the FIB in order to direct packet forwarding.

Optionally, the receiving module 501 is further configured to receive a third message sent by the controller, where the third message carries an address of a third next hop of the network device, and the third message includes third identification information.

The processing module 502 is further configured to delete, as indicated by the third identification information, from the next hop table stored in the network device, an entry that is of the third next hop and that corresponds to the address of the third next hop.

Further, the processing module 502 searches the next hop table as indicated by the third identification information using the address of the third next hop as a keyword, to hit the entry of the third next hop, and deletes the entry of the third next hop.

The processing module 502 is further configured to delete the routing entry that is associated with the address of the third next hop.

Therefore, when a plurality of routing entries correspond to a same next hop, the plurality of routing entries that use the next hop can be deleted by deleting the next hop corresponding to the plurality of routing entries. Therefore, only one message needs to be sent between the controller and the network device to achieve an objective of quickly deleting routing entries in batches. Therefore, a quantity of messages exchanged between the controller and the network device is greatly reduced, thereby saving system resources, and improving service processing efficiency.

Optionally, the processing module 502 is further configured to generate a fourth message, where the fourth message carries route status report information, and the route status report information records a mapping relationship between the route prefix and status information of the CRP route.

The network device 500 further includes a sending module 503, where the sending module 503 is configured to send the fourth message to the controller such that the controller updates statistical information of the route prefix based on the received route status report information to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or in real time, route status information reported by the network device, to learn a route status of the network device in real time, and use the route status information as a basis for adjusting the route, thereby improving traffic control reliability and realtimeness.

In a specific implementation, the fourth message is a fourth BGP update message, and is used to carry the route status report information. For a used specific message format, or a used specific field format (for example, used fields or extension fields), refer to description of a corresponding part in the foregoing method embodiment. Details are not described herein again. In another specific implementation, the fourth message is a fourth PCEP message, and is used to carry the route status report information. For a used specific message format, or a used specific field format (for example, used fields or extension fields), refer to description of a corresponding part in the foregoing method embodiment. Details are not described herein again. Optionally, the processing module 502 is further configured to generate a fifth message, where the fifth message carries next hop status report information, and the next hop status report information records a mapping relationship between an address of a fourth next hop and status information of the fourth next hop.

The sending module 503 is further configured to send the fifth message to the controller such that the controller updates statistical information of the next hop based on the received next hop status report information, to use updated statistical information as a basis for re-calculating the next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller can obtain, periodically or real-time, status information of the next hop reported by a forwarding device, to learn a status of the forwarding device in real time, and use the status information of the next hop as a basis for calculating and adjusting a next hop, thereby improving traffic control reliability and realtimeness.

In a specific implementation, the fifth message is a fifth BGP update message, and is used to carry the status information of the next hop. For a used specific message format, or a used specific field format (for example, used fields or extension fields), refer to description of a corresponding part in the foregoing method embodiment. Details are not described herein again.

In another specific implementation, the fifth message is a fifth PCEP message, and is used to carry the status information of the next hop. For a used specific message format, or a used specific field format (for example, used fields or extension fields), refer to description of a corresponding part in the foregoing method embodiment. Details are not described herein again. The network device 500 according to this embodiment of this application may correspond to the network device in the information synchronization method in the embodiments of this application. In addition, the foregoing and other operations and/or functions of modules in the network device are respectively used to implement corresponding procedures of the method 300 in FIG. 3A and FIG. 3B. For brevity, details are not described herein again.

According to the controller 400 and the network device 500 provided in the foregoing embodiments of this application, division of the foregoing function modules is merely used as an example for description. In actual application, the foregoing functions can be allocated to different function modules for implementation according to a requirement. To be specific, an internal structure of a device is divided into different function modules to implement all or some of the functions described above.

Figure 15:
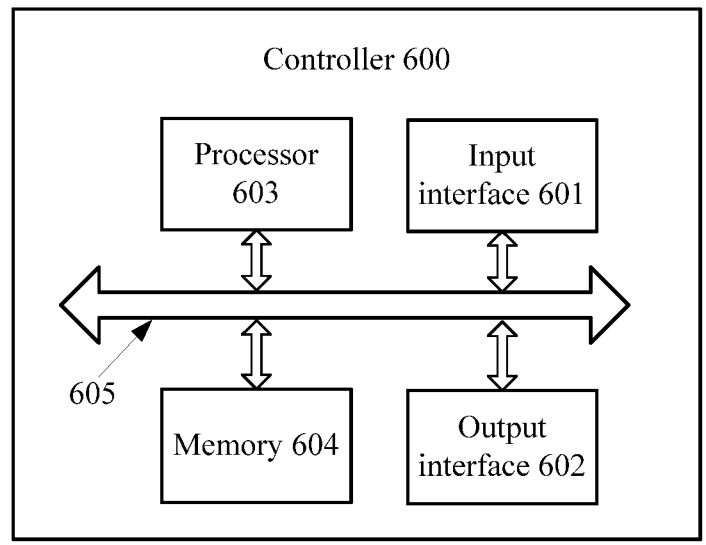
FIG. 15 is a schematic diagram of a hardware structure of a controller according to an embodiment of this application.

FIG. 15 is another schematic diagram of a controller 600 according to an embodiment of this application. The controller 600 may be the controller 110 in FIG. 2, and can be configured to perform the method 300 in FIG. 3A and FIG. 3B. As shown in FIG. 15, the controller 600 includes an input interface 601, an output interface 602, a processor 603, and a memory 604. The input interface 601, the output interface 602, the processor 603, and the memory 604 may be connected to each other using a bus system 605.

The memory 604 is configured to store a program, an instruction, or code. The processor 603 is configured to execute the program, the instruction, or the code in the memory 604 in order to control the input interface 601 to receive a signal, control the output interface 602 to send a signal, and implement operations in steps S301 to S303, S306 to S308, S311, S312, S318, and S321.

Figure 16:
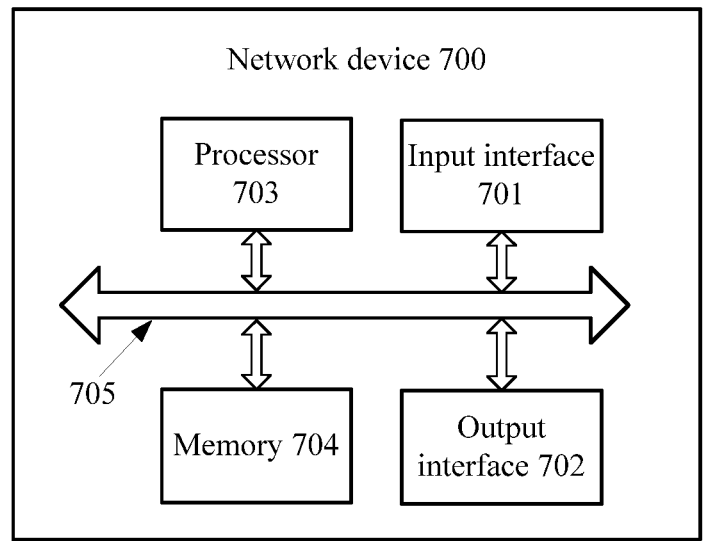
FIG. 16 is a schematic diagram of a hardware structure of a network device according to an embodiment of this application.

FIG. 16 is another schematic diagram of a network device 700 according to an embodiment of this application. The network device 700 can be configured to perform the method 300 in FIG. 3A and FIG. 3B. As shown in FIG. 16, the network device 700 includes an input interface 701, an output interface 702, a processor 703, and a memory 704. The input interface 701, the output interface 702, the processor 703, and the memory 704 may be connected to each other using a bus system 705.

The memory 704 is configured to store a program, an instruction, or code. The processor 703 is configured to execute the program, the instruction, or the code in the memory 704 in order to control the input interface 701 to receive a signal, control the output interface 702 to send a signal, and implement operations in steps S304, S305, S309, S310, S313 to S316, S319, and S320.

It should be understood that, in the embodiments of this application, the processor 603 and the processor 703 may be central processing units (CPU), or may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

The memory 604 and the memory 704 each may include a read-only memory (ROM) and a random access memory (RAM), and provide an instruction and data to the processor 603 and the processor 703, respectively. A part of the memory 604 or the memory 704 may further include a non-volatile RAM. For example, the memory 604 or the memory 704 may store information about a device type.

In addition to a data bus, the bus system 605 and the bus system 705 may further include a power bus, a control bus, a status signal bus, and the like. However, for clear description, various buses are marked as the bus system in the figure.

In an implementation process, the steps of the method 300 may be implemented using a hardware integrated logic circuit or an instruction in a form of software in the processor 603 and the processor 703. Steps of the method disclosed with reference to the embodiments of this application may be directly performed and accomplished using a hardware processor, or may be performed and accomplished using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory 604 and the memory 704, the processor 603 reads information in the memory 604, and the processor 703 reads information in the memory 704 to implement the steps of the foregoing method 300 in combination with hardware of the processor. To avoid repetition, details are not described herein again.

It should be noted that, the controller provided in FIG. 13 and FIG. 15, and the network device provided in FIG. 14 and FIG. 16 are applied to the SDN 100 shown in FIG. 2, to implement the information synchronization method. In a specific implementation, the processing module 401 in FIG. 13 may be implemented using the processor 603 in FIG. 15, the sending module 402 may be implemented using the output interface 602 in FIG. 15, and the receiving module 403 may be implemented using the input interface 601 in FIG. 15. Likewise, the processing module 502 in FIG. 14 may be implemented using the processor 703 in FIG. 16, the sending module 503 may be implemented using the output interface 702 in FIG. 16, and the receiving module 501 may be implemented using the input interface 701 in FIG. 16.

This application further provides a communications system, including a controller and a network device, where the controller may be the controller provided in the embodiment corresponding to FIG. 13 or FIG. 15. The network device may be the network device provided in the embodiment corresponding to FIG. 14 or FIG. 16. The communications system is configured to perform the method 300 in the embodiment corresponding to FIG. 3A to FIG. 12.

It should be understood that sequence numbers of the foregoing processes do not mean execution sequences in various embodiments of this application. The execution sequences of the processes should be determined according to functions and internal logic of the processes, and should not be construed as any limitation to the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

A person skilled in the art should be aware that in the foregoing one or more examples, functions described in this application may be implemented by hardware, software, or any combination thereof. When the functions are implemented in the form of a software functional module and sold or used as an independent product, the functions may be stored in a computer readable storage medium. Based on such an understanding, the technical solutions of the present disclosure essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The embodiments in this specification are all described in a progressive manner, and for same or similar parts in the embodiments, reference may be made to these embodiments, and each embodiment focuses on a difference from other embodiments. Especially, apparatus and system embodiments are basically similar to a method embodiment, and therefore are described briefly, for related parts, reference may be made to partial descriptions in the method embodiment.

In summary, it should be noted that what is described above is merely example embodiments of the technical solutions of this application, but is not intended to limit the protection scope of this application. Obviously, a person skilled in the art can make various modifications and variations to this application without departing from the scope of this application. This application is intended to cover these modifications and variations provided that they fall within the scope of protection defined by the following claims and their equivalent technologies.

What is claimed is:

1. An information synchronization method implemented by a controller, wherein the information synchronization method comprises:
    generating a first message advertising a control routing protocol (CRP) route, wherein the first message comprises:
        CRP routing entry information comprising a mapping relationship between a route prefix and an address of a first next hop of a forwarding device; and
        first identification information instructing the forwarding device to store the CRP routing entry information into a CRP routing table of the forwarding device, wherein the CRP routing table is configured to store the CRP route advertised by the controller separately from a routing table used to store routes advertised between forwarding devices; and
    sending the first message to the forwarding device.

2. The information synchronization method of claim 1, wherein the CRP routing entry information further comprises a route priority identifying a priority at which the CRP route directs packet forwarding.

3. The information synchronization method of claim 1, wherein the CRP routing entry information further comprises attribute information of the first next hop, and wherein the attribute information comprises at least one of:
bandwidth;
a load balancing ratio; or
a type of the next hop.

4. The information synchronization method of claim 1, further comprising:
generating a second message comprising:
entry information of a second next hop of the forwarding device, wherein the entry information of the second next hop comprises a mapping relationship between an address of the second next hop and attribute information of the second next hop; and
second identification information instructing the forwarding device to store the entry information of the second next hop into a next hop table of the forwarding device; and
sending, by the controller, the second message to the forwarding device.

5. The information synchronization method of claim 1, further comprising:
generating a third message comprising:
an address of a third next hop of the forwarding device; and
third identification information instructing the forwarding device to delete, from a next hop table, an entry of the third next hop corresponding to the address of the third next hop; and
sending the third message to the forwarding device.

6. The information synchronization method of claim 1, further comprising:
receiving, from the forwarding device, a fourth message comprising route status report information comprising a mapping relationship between the route prefix and status information of the CRP route; and
updating statistical information of the route prefix based on the received route status report information to set updated statistical information as a basis for re-calculating the CRP route.

7. An information synchronization method implemented by a forwarding device comprising a control routing protocol (CRP) routing table, wherein the information synchronization method comprises:
receiving, from a controller, a first message advertising a CRP route, wherein the first message comprises:
CRP routing entry information comprising a mapping relationship between a route prefix and an address of a first next hop of the forwarding device; and
first identification information;
storing the CRP routing entry information into a CRP routing table, wherein the CRP routing table is configured to store the CRP route advertised by the controller separately from a routing table used to store routes advertised between forwarding devices; and
forwarding packets based on the CRP routing table.

8. The information synchronization method of claim 7, wherein the CRP routing entry information further comprises a route priority identifying a priority at which the CRP route directs the packet forwarding.

9. The information synchronization method of claim 7, wherein the CRP routing entry information further comprises attribute information of the first next hop, wherein the attribute information comprises at least one of:
bandwidth;
a load balancing ratio; or
an access type of the next hop, and wherein the information synchronization method further comprises:
storing the address of the first next hop and the attribute information of the first next hop into an entry of the first next hop in a next hop table of the forwarding device; and
sending, by the forwarding device, the attribute information of the first next hop to a forwarding information base, wherein the entry of the first next hop records a mapping relationship between the address of the first next hop and the attribute information of the first next hop.

10. The information synchronization method of claim 7, further comprising:
receiving, from the controller, a second message comprising entry information of a second next hop of the forwarding device, wherein the entry information comprises:
a mapping relationship between an address of the second next hop and attribute information of the second next hop; and
second identification information; and
storing the entry information of the second next hop into the next hop table of the forwarding device.

11. The information synchronization method of claim 7, further comprising:
receiving, from the controller, a third message comprising:
an address of a third next hop of the forwarding device; and
third identification information; and
deleting, from a next hop table, an entry of the third next hop corresponding to the address of the third next hop.

12. The information synchronization method of claim 7, further comprising:
generating a fourth message comprising route status report information recording a mapping relationship between the route prefix and status information of the CRP route; and
sending the fourth message to the controller.

13. A controller comprising:
a non-transitory memory comprising instructions;
a processor in communications with the non-transitory memory, wherein the instructions when executed by the processor cause the processor to:
generate a first message advertising a control routing protocol (CRP) route, wherein the first message comprises:
CRP routing entry information comprising a mapping relationship between a route prefix and an address of a first next hop of a forwarding device; and
first identification information instructing the forwarding device to store the CRP routing entry information into a CRP routing table of the forwarding device, wherein the CRP routing table is configured to store the CRP route advertised by the controller separately from a routing table used to store routes advertised between forwarding devices; and
an output interface coupled to the processor and the non-transitory memory and configured to send the first message to the forwarding device.

14. The controller of claim 13, wherein the CRP routing entry information further comprises a route priority identifying a priority at which the CRP route directs packet forwarding.

15. The controller of claim 13, wherein the CRP routing entry information further comprises attribute information of the first next hop comprising at least one:
bandwidth;
a load balancing ratio; or
a type of the next hop.

16. The controller of claim 13, wherein the first message is either:
a first Border Gateway Protocol (BGP) update message, wherein the first BGP update message comprises a multiprotocol reachable network layer reachability information (MP_REACH_NLRI) attribute field, wherein the MP_REACH_NLRI attribute field comprises a subsequent address family identifier (SAFI) field, a network layer reachability information (NLRI) field, and a next hop information field, wherein the SAFI field indicates that the MP_REACH_NLRI attribute field is encapsulated based on an encapsulation format supported by a BGP synchronization address family and carries the first identification information, wherein the NLRI field carries the route prefix, and wherein the next hop information field carries the address of the first next hop; or
a first Path Computation Element Communication Protocol (PCEP) message, wherein the first PCEP message comprises a Message-Type field, a Route object field, and a Next Hop object field, wherein the Message-Type field carries the first identification information, wherein the Route object field carries the route prefix, and wherein the Next Hop object field carries the address of the first next hop.

17. The controller of claim 13, wherein the instructions further cause the processor to generate a second message comprising:
entry information of a second next hop of the forwarding device, wherein the entry information comprises a mapping relationship between an address of the second next hop and attribute information of the second next hop; and
second identification information instructing the forwarding device to store the entry information of the second next hop into a next hop table of the forwarding device, and
wherein the output interface is further configured to send the second message to the forwarding device.

18. The controller of claim 13, wherein the instructions further cause the processor to generate a third message comprising an address of a third next hop of the forwarding device and third identification information instructing the forwarding device to delete, from a next hop table, an entry of the third next hop corresponding to the address of the third next hop, and wherein the output interface is further configured to send the third message to the forwarding device.

19. The controller of claim 13, further comprising an input interface coupled to the processor and configured to receive, from the forwarding device, a fourth message comprising route status report information recording a mapping relationship between the route prefix and status information of the CRP route, and wherein the instructions further cause the processor to update statistical information of the route prefix based on the received route status report information to set updated statistical information as a basis for re-calculating the CRP route.

20. The controller of claim 13, further comprising an input interface coupled to the processor and configured to receive, from the forwarding device, a fifth message comprising next hop status report information recording a mapping relationship between an address of a fourth next hop of the forwarding device and status information of the fourth next hop, and wherein the instructions further cause the processor to update statistical information of the fourth next hop based on the received next hop status report information to set updated statistical information as a basis for re-calculating a next hop of the forwarding device.

21. A forwarding device comprising:
an input interface configured to receive, from a controller, a first message advertising a control routing protocol (CRP) route, wherein the first message comprises:
CRP routing entry information comprising a mapping relationship between a route prefix and an address of a first next hop; and
first identification information;
a non-transitory memory comprising instructions and a CRP routing table; and
a processor in communication with the non-transitory memory and the input interface, wherein the instructions when executed by the processor cause the processor to:
store the CRP routing entry information into the CRP routing table as indicated by the first identification information, wherein the CRP routing table is configured to store the CRP route advertised by the controller separately from a routing table used to store routes advertised between forwarding devices; and
forward packets based on the CRP routing table.

22. The forwarding device of claim 21, wherein the CRP routing entry information further comprises a route priority identifying a priority at which the CRP route directs the packet forwarding.

23. The forwarding device of claim 21, wherein the CRP routing entry information further comprises attribute information of the first next hop comprising at least one of:
bandwidth;
a load balancing ratio; or
an access type of the next hop, and
wherein the instructions further cause the processor to be configured to:
store the address of the first next hop and the attribute information of the first next hop into an entry of the first next hop in a next hop table of the forwarding device; and
send the attribute information of the first next hop to a forwarding information base, wherein the entry of the first next hop records a mapping relationship between the address of the first next hop and the attribute information of the first next hop.

24. The forwarding device of claim 21, wherein the input interface is further configured to receive, from the controller, a second message comprising:
entry information of a second next hop of the forwarding device, wherein the entry information comprises a mapping relationship between an address of the second next hop and attribute information of the second next hop; and
second identification information, and
wherein the instructions further cause the processor to store the entry information of the second next hop into a next hop table as indicated by the second identification information.

25. The forwarding device of claim 21, wherein the input interface is further configured to receive, from the controller, a third message comprising:

an address of a third next hop of the forwarding device; and third identification information, and wherein the instructions further cause the processor to be configured to delete, from the next hop table as indicated by the third identification information, an entry of the third next hop corresponding to the address of the third next hop.

26. The forwarding device of claim 21, wherein the forwarding device further comprises an output interface coupled to the processor and configured to:

generate a fourth message comprising route status report information recording a mapping relationship between the route prefix and status information of the CRP route; and send the fourth message to the controller.

27. The forwarding device of claim 21, wherein the forwarding device further comprises an output interface coupled to the processor and configured to:

generate a fifth message comprising next hop status report information recording a mapping relationship between an address of a fourth next hop of the forwarding device and status information of the fourth next hop; and send the fifth message to the controller to enable the controller to update statistical information of the fourth next hop based on the received next hop status report information to set updated statistical information as a basis for re-calculating a next hop of the forwarding device.

* * * * *